United States Patent
Glover et al.

(10) Patent No.: US 9,946,794 B2
(45) Date of Patent: Apr. 17, 2018

(54) ACCESSING SPECIAL PURPOSE SEARCH SYSTEMS

(71) Applicant: Samsung Electronics Co., Ltd., Suwon-si, Gyeonggi-do (KR)

(72) Inventors: Eric J. Glover, Palo Alto, CA (US); Christopher Hoffman, San Luis Obispo, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 641 days.

(21) Appl. No.: 14/528,150

(22) Filed: Oct. 30, 2014

(65) Prior Publication Data
US 2016/0125080 A1   May 5, 2016

(51) Int. Cl.
*G06F 17/30* (2006.01)

(52) U.S. Cl.
CPC .............. *G06F 17/30864* (2013.01)

(58) Field of Classification Search
None
See application file for complete search history.

(56) References Cited

U.S. PATENT DOCUMENTS

| | | | | |
|---|---|---|---|---|
| 2008/0016034 A1* | 1/2008 | Guha | ............. | G06F 17/30864 |
| 2010/0281012 A1* | 11/2010 | Imig | ............. | G06F 17/30864 707/708 |
| 2011/0246572 A1* | 10/2011 | Kollenkark | ........ | H04N 21/4755 709/204 |
| 2013/0132357 A1* | 5/2013 | Edgar | ............. | G06F 17/30864 707/706 |
| 2014/0365462 A1* | 12/2014 | Chang | ............. | G06F 17/30864 707/711 |
| 2015/0066886 A1* | 3/2015 | Wu | ............. | G06F 17/30864 707/706 |

* cited by examiner

*Primary Examiner* — Richard Bowen
(74) *Attorney, Agent, or Firm* — Jefferson IP Law, LLP

(57) ABSTRACT

A method includes receiving, at a computing device, a search query from a general purpose search system or a user device in communication with the general purpose search system and assessing, at the computing device, a special purpose search intent of the search query. The method also includes sending a recommendation from the computing device to at least one of the general purpose search system or the user device, the recommendation indicating whether to send the search query to a special purpose search system to obtain special purpose search results.

39 Claims, 13 Drawing Sheets

ACCESSING SPECIAL PURPOSE SEARCH SYSTEMS

TECHNICAL FIELD

This disclosure relates to assessing when to access special purpose search systems to include special purpose search results in general purpose search results.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions.

SUMMARY

This disclosure is directed to integrating special purpose search engines with general purpose search engines. A special purpose search provider may operate a special purpose search system (e.g., an application search system) and provide application search hardware (e.g., a box) to a general purpose search provider, which operates a general purpose search system. The application search hardware receives search queries sent to the general purpose search system and determines whether to forward the queries on to the application search system. For example, the application search hardware may transmit a search query to the application search system when the application search hardware determines that it will be beneficial to include application search results in search results of the general purpose search system. The application search hardware may determine whether to send a search query to the application search system based on a variety of different parameters, such as application data and user behavioral data acquired from one or more of the general purpose search systems.

One aspect of the disclosure provides a method that includes receiving, at a computing device, a search query from a general purpose search system or a user device in communication with the general purpose search system and assessing, at the computing device, a special purpose search intent of the search query. The method also includes sending a recommendation from the computing device to at least one of the general purpose search system or the user device, the recommendation indicating whether to send the search query to a special purpose search system (e.g. an application search system) to obtain special purpose search results (e.g., access mechanisms or links for applications).

Implementations of the disclosure may include one or more of the following optional features. In some implementations, the method includes receiving information related to special purpose searches from the special purpose search system and determining the recommendation based on the received information. In some examples, the recommendation includes an integer value of zero or one (e.g., a Boolean value), where zero instructs not sending the search query to the special purpose search system, and one instructs sending the search query to the special purpose search system. Additionally or alternatively, the recommendation includes a numerical (e.g., decimal value), where the greater the value of the decimal value, the greater the recommendation to send the search query to the special purpose search system.

The method may include receiving the search query at multiple scoring modules executing at the computing device. Each scoring module assesses the search query and outputs a corresponding module score (e.g., a hint) indicating whether to send the search query to the special purpose search system. The method includes determining, at the computing device, the recommendation based on the module scores. In some examples, each module score includes an indicator recommending sending the search query to the special purpose search system, not sending the search query to the special purpose search system, or no recommendation on whether to send the search query to the special purpose search system.

In some implementations, receiving the search query at multiple scoring modules includes receiving the search query at a partner data module executing at the computing device. The partner data module assesses the search query based on historical special purpose application search and selection user behavior data in a special purpose search domain. The special purpose application search and selection user behavior data may include user responses to past search queries. The method may include receiving the historical special purpose application search and selection user behavior data from other general purpose search systems.

In some implementations, receiving the search query at multiple scoring modules includes receiving the search query at a metadata module executing at the computing device. The metadata module assesses the search query by matching the search query with metadata associated with special purpose search results or synonyms of the metadata, the metadata having an associated metadata score and outputting a module score based on a metadata score of any matched metadata. The metadata score indicates a level of popularity of the special purpose search result. The method may include receiving the metadata associated with special purpose search results from the special purpose search system. Moreover, the method may include normalizing the search query and the metadata before matching the search query with the metadata.

In some implementations, receiving the search query at multiple scoring modules includes receiving the search query at a search confidence module executing at the computing device. The search confidence module assesses the search query by matching the search query with a previously executed search query of the special purpose search system and outputting a module score based on a search confidence score associated with the previously executed search query. The search confidence score indicates a level of relevance or user-satisfaction of the previously executed search query based on past user responses to the previously executed search query. The search confidence module may output a favorable module score recommending that the general purpose search system or the user device send the search query to the special purpose search system when the search confidence score is greater than a threshold search confidence score.

In some implementations, receiving the search query at multiple scoring modules includes receiving the search query at a grammar matching module executing at the computing device. The grammar matching module assesses the search query by matching the search query with a grammar within a search domain of the special purpose search system. Each grammar has an associated grammar score. The grammar matching module outputs a module score based on the associated grammar score of the matching grammar.

In some implementations, receiving the search query at multiple scoring modules includes receiving the search query at a feedback module executing at the computing device. The feedback module assesses the search query based on user response data received from the general purpose search system. The user response data indicates a level of responsiveness to special purpose search results generated by the special purpose search system.

Another aspect of the disclosure provides a recommendation device that includes a computing device in communication with a general purpose search system and a special purpose search system and non-transitory memory in communication with the computing device. The non-transitory memory stores instructions that when executed on the computing device cause the computing device to perform operations that includes receiving a search query from the general purpose search system or a user device in communication with the general purpose search system, assessing a special purpose search intent of the search query, and sending a recommendation from the computing device to at least one of the general purpose search system or the user device. The recommendation indicates whether to send the search query to the special purpose search system to obtain special purpose search results. The recommendation device may include one or more of the following optional features.

In some implementations, the operations include receiving information related to special purpose searches from the special purpose search system and determining the recommendation based on the received information. In some examples, the recommendation includes an integer value of zero or one, where zero instructs not sending the search query to the special purpose search system, and one instructs sending the search query to the special purpose search system. Additionally or alternatively, the recommendation includes a decimal value, where the greater the value of the decimal value, the greater the recommendation to send the search query to the special purpose search system.

The operations may include receiving the search query at multiple scoring modules executing at the computing device. Each scoring module assesses the search query and outputs a corresponding module score indicating whether to send the search query to the special purpose search system. The operations include determining, at the computing device, the recommendation based on the module scores. In some examples, each module score includes an indicator recommending sending the search query to the special purpose search system, not sending the search query to the special purpose search system, or no recommendation on whether to send the search query to the special purpose search system.

In some implementations, receiving the search query at multiple scoring modules includes receiving the search query at a partner data module executing at the computing device. The partner data module assesses the search query based on historical special purpose application search and selection user behavior data in a special purpose search domain. The special purpose application search and selection user behavior data may include user responses to past search queries. The operations may include receiving the historical special purpose application search and selection user behavior data from other general purpose search systems.

In some implementations, receiving the search query at multiple scoring modules includes receiving the search query at a metadata module executing at the computing device. The metadata module assesses the search query by matching the search query with metadata associated with special purpose search results or synonyms of the metadata, the metadata having an associated metadata score and outputting a module score based on a metadata score of any matched metadata. The metadata score indicates a level of popularity of the special purpose search result. The operations may include receiving the metadata associated with special purpose search results from the special purpose search system. Moreover, the operations may include normalizing the search query and the metadata before matching the search query with the metadata.

In some implementations, receiving the search query at multiple scoring modules includes receiving the search query at a search confidence module executing at the computing device. The search confidence module assesses the search query by matching the search query with a previously executed search query of the special purpose search system and outputting a module score based on a search confidence score associated with the previously executed search query. The search confidence score indicates a level of relevance or popularity of the previously executed search query based on past user responses to the previously executed search query. The search confidence module may output a favorable module score recommending that the general purpose search system or the user device send the search query to the special purpose search system when the search confidence score is greater than a threshold search confidence score.

In some implementations, receiving the search query at multiple scoring modules includes receiving the search query at a grammar matching module executing at the computing device. The grammar matching module assesses the search query by matching the search query with a grammar within a search domain of the special purpose search system. Each grammar has an associated grammar score. The grammar matching module outputs a module score based on the associated grammar score of the matching grammar.

In some implementations, receiving the search query at multiple scoring modules includes receiving the search query at a feedback module executing at the computing device. The feedback module assesses the search query based on user response data received from the general purpose search system. The user response data indicates a level of responsiveness to special purpose search results generated by the special purpose search system.

In yet another aspect, a search system includes a special purpose search system in communication with a remote general purpose search system (e.g., a third-party system) and a recommendation device in communication with the general purpose search system and the special purpose search system. The recommendation device receives a search query from the general purpose search system or a user device in communication with the general purpose search system, assesses a special purpose search intent of the search query, and sends a recommendation to at least one of the general purpose search system or the user device. The recommendation indicates whether to send the search query to the special purpose search system to obtain special purpose search results. This aspect may include any of the following optional features.

In some implementations, the recommendation device receives information related to special purpose searches from the special purpose search system and determines the recommendation based on the received information. In some examples, the recommendation includes an integer value of zero or one, where zero instructs not sending the search query to the special purpose search system, and one instructs sending the search query to the special purpose search system. Additionally or alternatively, the recommendation includes a decimal value, where the greater the value of the decimal value, the greater the recommendation to send the search query to the special purpose search system.

The recommendation device may receive the search query at multiple scoring modules executing at the recommendation device. Each scoring module assesses the search query and outputs a corresponding module score indicating whether to send the search query to the special purpose search system. The recommendation device determines the recommendation based on the module scores. In some examples, each module score includes an indicator recommending sending the search query to the special purpose search system, not sending the search query to the special purpose search system, or no recommendation on whether to send the search query to the special purpose search system.

In some implementations, receiving the search query at multiple scoring modules includes receiving the search query at a partner data module executing at the recommendation device. The partner data module assesses the search query based on historical special purpose application search and selection user behavior data in a special purpose search domain. The special purpose application search and selection user behavior data may include user responses to past search queries. The method may include receiving the historical special purpose application search and selection user behavior data from other general purpose search systems.

In some implementations, receiving the search query at multiple scoring modules includes receiving the search query at a metadata module executing at the recommendation device. The metadata module assesses the search query by matching the search query with metadata associated with special purpose search results or synonyms of the metadata, the metadata having an associated metadata score and outputting a module score based on a metadata score of any matched metadata. The metadata score indicates a level of popularity of the special purpose search result. The method may include receiving the metadata associated with special purpose search results from the special purpose search system. Moreover, the method may include normalizing the search query and the metadata before matching the search query with the metadata.

In some implementations, receiving the search query at multiple scoring modules includes receiving the search query at a search confidence module executing at the recommendation device. The search confidence module assesses the search query by matching the search query with a previously executed search query of the special purpose search system and outputting a module score based on a search confidence score associated with the previously executed search query. The search confidence score indicates a level of relevance or popularity of the previously executed search query based on past user responses to the previously executed search query. The search confidence module may output a favorable module score recommending that the general purpose search system or the user device send the search query to the special purpose search system when the search confidence score is greater than a threshold search confidence score.

In some implementations, receiving the search query at multiple scoring modules includes receiving the search query at a grammar matching module executing at the recommendation device. The grammar matching module assesses the search query by matching the search query with a grammar within a search domain of the special purpose search system. Each grammar has an associated grammar score. The grammar matching module outputs a module score based on the associated grammar score of the matching grammar.

In some implementations, receiving the search query at multiple scoring modules includes receiving the search query at a feedback module executing at the recommendation device. The feedback module assesses the search query based on user response data received from the general purpose search system. The user response data indicates a level of responsiveness to special purpose search results generated by the special purpose search system.

Another aspect of the disclosure provides a method that includes receiving, at a computing device, a search query from a general purpose search system or a user device in communication with the general purpose search system, assessing, at the computing device, a special purpose search intent of the search query, and when the search query has the special purpose search intent, sending the search query from the computing device to a special purpose search system that generates special purpose search results. When the search query is not assessed as having the special purpose intent, the method includes sending a notification to the general purpose search system indicating the lack of special purpose intent with respect to the search query.

In some implementations, the method includes receiving information related to special purpose searches from the special purpose search system and determining whether the search query has the special purpose search intent based on the received information. The assessing the special purpose search intent of the search query may include assigning an integer value to the search query of zero or one, where zero instructs not sending the search query to the special purpose search system, and one instructs sending the search query to the special purpose search system. In some examples, the method includes assigning a decimal value to the search query, where the greater the value of the decimal value, the greater a recommendation to send the search query to the special purpose search system. The method may further include sending the search query from the computing device to the special purpose search system when the decimal value is greater than a threshold value.

In some implementations, the method includes receiving the search query at multiple scoring modules executing at the computing device. Each scoring module assesses the search query and outputs a corresponding module score indicating whether to send the search query to the special purpose search system. The method may include assessing, at the computing device, the special purpose search intent of the search query based on at least one module score. In some examples, the method includes sending the search query from the computing device to the special purpose search system when at least one module score is greater than a threshold value.

In some examples, each module score includes an indicator recommending sending the search query to the special purpose search system, not sending the search query to the special purpose search system, or no recommendation on whether to send the search query to the special purpose search system.

In some implementations, receiving the search query at multiple scoring modules includes receiving the search query at a partner data module executing at the computing device. The partner data module assesses the search query based on historical special purpose application search and selection user behavior data in a special purpose search domain. The special purpose application search and selection user behavior data may include user responses to past search queries. The method may include receiving the historical special purpose application search and selection user behavior data from other general purpose search systems.

In some implementations, receiving the search query at multiple scoring modules includes receiving the search query at a metadata module executing at the computing device. The metadata module assesses the search query by matching the search query with metadata associated with special purpose search results or synonyms of the metadata, the metadata having an associated metadata score and outputting a module score based on a metadata score of any matched metadata. The metadata score indicates a level of popularity of the special purpose search result. The method may include receiving the metadata associated with special purpose search results from the special purpose search system. Moreover, the method may include normalizing the search query and the metadata before matching the search query with the metadata.

In some implementations, receiving the search query at multiple scoring modules includes receiving the search query at a search confidence module executing at the computing device. The search confidence module assesses the search query by matching the search query with a previously executed search query of the special purpose search system and outputting a module score based on a search confidence score associated with the previously executed search query. The search confidence score indicates a level of relevance or popularity of the previously executed search query based on past user responses to the previously executed search query. The search confidence module may output a favorable module score recommending that the general purpose search system or the user device send the search query to the special purpose search system when the search confidence score is greater than a threshold search confidence score.

In some implementations, receiving the search query at multiple scoring modules includes receiving the search query at a grammar matching module executing at the computing device. The grammar matching module assesses the search query by matching the search query with a grammar within a search domain of the special purpose search system. Each grammar has an associated grammar score. The grammar matching module outputs a module score based on the associated grammar score of the matching grammar.

In some implementations, receiving the search query at multiple scoring modules includes receiving the search query at a feedback module executing at the computing device. The feedback module assesses the search query based on user response data received from the general purpose search system. The user response data indicates a level of responsiveness to special purpose search results generated by the special purpose search system. In some examples, the method includes receiving, at the computing device, special purpose search results from the special purpose search system and transmitting the special purpose search results from the computing device to the general purpose search system.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A search provider may provide a broad search service and/or a mixed purpose search service. A broad search service may provide general search results across multiple categories and is generally not tailored to providing any particular type of search result. On the other hand, a special purpose search service may provide search results of one type (or a few types), such as applications for mobile devices. A mixed purpose search service may provide both general search results from a general purpose search system and special purpose search results of a particular type from a special purpose search system. While a broad search service may, in response to a query, return search results that can include identification of applications for mobile devices, those broad search services may not be tailored for providing a specific type of search results, such as applications. Moreover, mixed purpose search services need to overcome the challenge of reliably determining which search queries should be handled by the general purpose search system and which search queries should be handled by the special purpose search system. One way to solve this problem is to allow a user to select a type of search, such as a general search or a special purpose search (e.g., by displaying a pull down box having an item labeled "Search for Apps." This solution, however, does not accommodate users that do not realize that an application may meet their search intent and/or satisfy their search query or don't want to take the time to make such a selection. This disclosure describes techniques for determining when to include special purpose search results, such as application search results, of a special purpose search system in general search results of a general purpose search system.

Figure 1A:
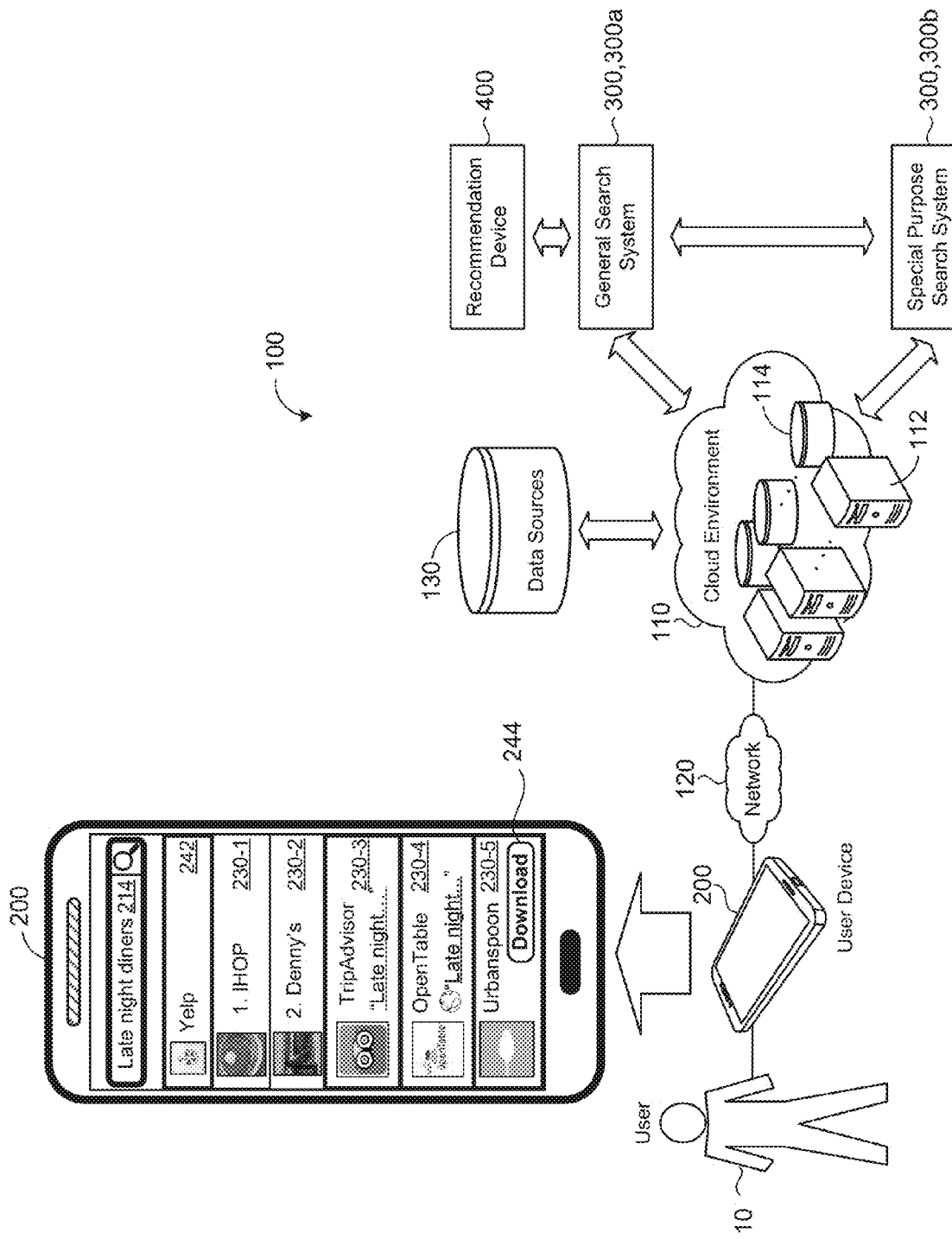
FIG. 1A is a schematic view of an example environment including a user device in communication with a search system.
Figure 1B:
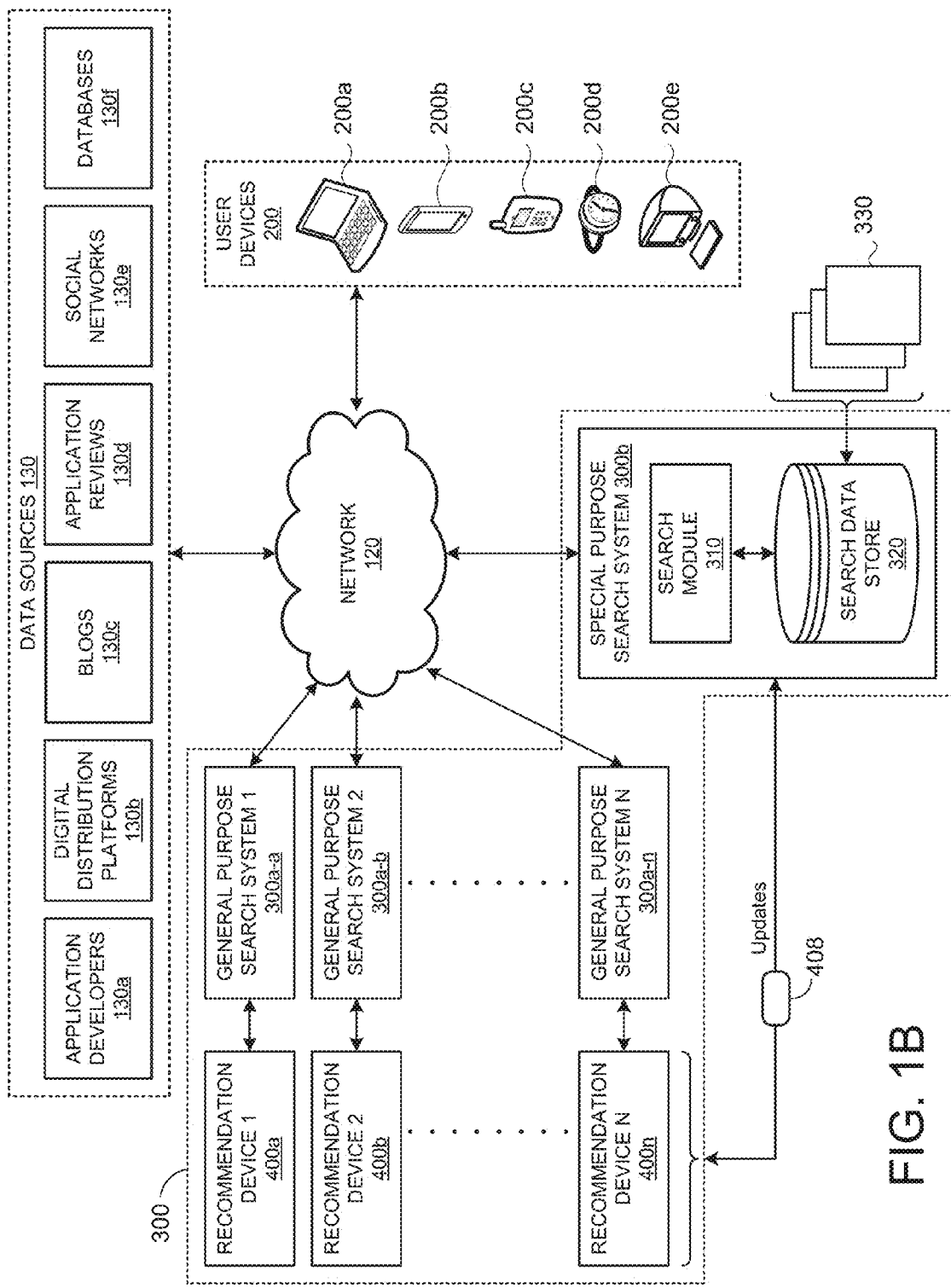
FIG. 1B is a functional block diagram of a search system having a general purpose search system, a special purpose search system, and a recommendation device interacting with user devices and data sources.

FIG. 1A illustrates an example system 100 that includes a user device 200 associated with a user 10 in communication with a remote system 110 via a network 120. FIG. 1B provides a functional block diagram of the system 100. The remote system 110 may be a distributed system (e.g., cloud environment) having scalable/elastic computing resources 112 and/or storage resources 114. The user device 200 and/or the remote system 110 may implement one or more search systems 300, such as a general search system 300a and a special purpose search system 300b, and optionally receive data from one or more data sources 130. In some implementations, the special purpose search system 300b communicates with one or more user devices 200 and the data source(s) 130 via the network 120. The network 120 may include various types of networks, such as a local area network (LAN), wide area network (WAN), and/or the Internet.

In the examples shown, the system 100 includes a plurality of general purpose search systems 300a, 300a-a-300a-n, a special purpose search system 300b, and an application-search recommendation device 400, 400a-n (referred to herein as a recommendation device) for each general purpose search system 300a. In some implementations, the recommendation device 400 is part of the corresponding general purpose search system 300a; while in other implementations, the recommendation device 400 is separate and remote from, yet in communication with, the corresponding general purpose search system 300a. The recommendation device 400 may also communicate with the special purpose search system 300b, which can be an application search system.

To minimize latency within the system 100, the recommendation device 400 may reside within the same communications network zone as the general purpose search system(s) 300a. In other words, the recommendation device 400 may be physically located about or near the general purpose search system(s) 300a, so that a communication time between the two is kept to a minimum. For example, if the general purpose search system 300a is in China and the special purpose search system 300b is in the United States of America, the recommendation device 400 may be physically located in China so that the recommendation device 400 does not need to communicate through a transoceanic cable (such as an optical submarine cable) to communicate with the general purpose search system 300a. This can be beneficial when the recommendation device 400 advises against communicating with the special purpose search system 300b. Therefore, any long haul communications only occur when the general purpose search system 300a and/or the recommendation device 400 needs to communicate with the special purpose search system 300b.

In some implementations, the special purpose search engine 300b is an application search engine. An application search engine 300b is a collection of computing devices that receive a search query 212 and perform an application search or "app search" based on the search query 212 and any other available contextual information. The application search engine 300b returns search results 220 that indicate applications that correspond to the search query 212. For example, in response to the search query 212 "puzzles," an application search engine may return search results 220 that indicate logic games and puzzle games. In another example, in response to a search query of "view documents," the application search engine 300b may return search results 220 that indicate various electronic document viewer applications and word processing applications. In some implementations, application search results 220 include one or more access mechanisms 202 for accessing a digital distribution platform 130b, where the user 10 can elect to download an application indicated by the search results 220. A digital distribution platform 130b is a collection of one or more computing devices where a user device 200 can request an application. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation. In some implementations, the application search engine 300b is integrated into a digital distribution platform 130b. In response to selection of an access mechanism 202, the user device 200 may access the digital distribution platform 130b indicated by the access mechanism 202. For example, the user device 200 may access the digital distribution platform 130b via a web browser or a native client application. The access mechanism 202 accesses a specific state of the digital distribution platform 130b where the user 10 can opt to access or download the application indicated in the selected search result 220.

Figure 2A:
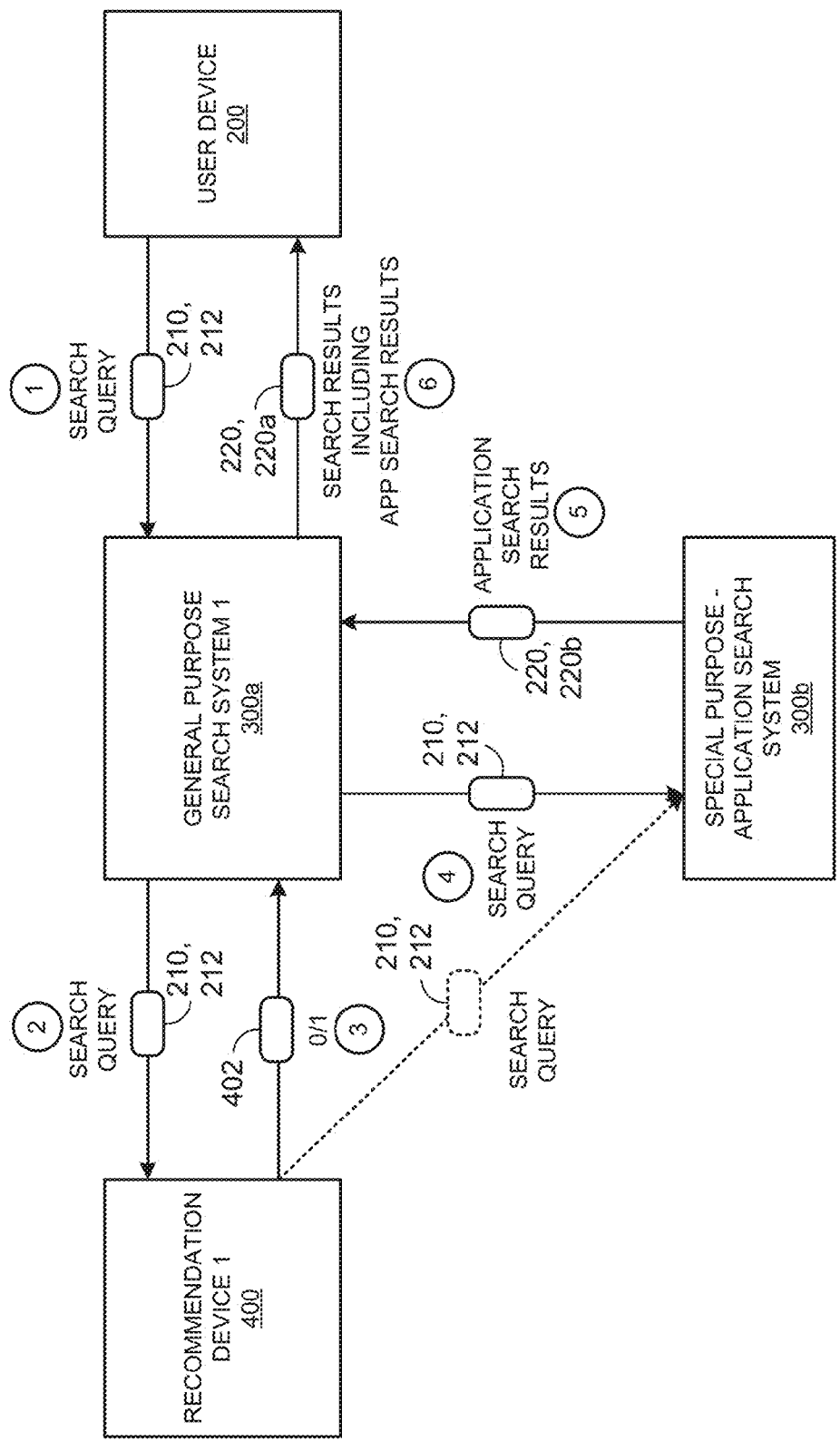
FIG. 2A is a schematic view of an example general purpose search system interacting with a special purpose a search system, a recommendation device, and a user device.

Referring to FIGS. 1B and 2A, the search system 300 may include one or more general purpose search systems 300a, 300a-a-300a-n that receive search queries 212 from user devices 200. The general purpose search systems 300a, 300a-a-300a-n each include or are in communication with a recommendation device 400, 400a-n that determines whether the corresponding general purpose search system 300a or user device should send the search query 210, 212 to the special purpose search system 300b (e.g., an application search system) for processing.

In the example shown in FIG. 2A, at 1, the user device 200 generates and/or transmits a search query 212 (or a query wrapper 210 containing the search query 212 and optionally other information) to the general purpose search system 300a, which, at 2, forwards the search query 210, 212 to the recommendation device 400. The recommendation device 400 evaluates the search query 210, 212 and determines whether the general purpose search system 300a should send the search query 210, 212 to the special purpose search system 300b (e.g., an application search system). At 3, the recommendation device 400 returns a recommendation 402 to the general purpose search system 300a, signaling or instructing the general purpose search system 300a to either query or not query the special purpose search system 300b (i.e., send or not send the search query 210, 212 to the special purpose search system 300b). In some examples, the general purpose search system 300a receives a query wrapper 210 that includes the search query 212 and one or more parameters for the requested search. The general purpose search system 300a may forward only the search query 212 to recommendation device 400, and upon receiving a positive response from the recommendation device 400, forward the query wrapper 210 to the special purpose search system 300b (or another query wrapper 210 reconfigured or formatted for the special purpose search system 300b). The information sent to the special purpose search system 300b may be different form the information received by the general purpose search system 300a.

In some implementations, the recommendation 402 includes a binary 0 or 1, where 0 indicates that the general purpose search system 300a should not query the special purpose search system 300b, and 1 indicates that the general purpose search system 300a should query the special purpose search system 300b. In additional or alternative implementations, the recommendation 402 includes a string (e.g., "No" or "Yes"), a data structure, a strongly typed data object, or other information indicating whether the general purpose search system 300a should query the special purpose search system 300b. In some examples, the recommendation device 400 returns a recommendation 402 that includes either a populated data structure or object, such as a Java script object notation (JSON) object, signifying a recommendation to send the search query 212 to the special purpose search system 300b or an empty data structure or object (e.g., JSON object) signifying a recommendation to not send the search query 212 to the special purpose search system 300b.

When the recommendation device 400 instructs the general purpose search system 300a, via the recommendation 402, to forward the search query 210, 212 to the special purpose search system 300b, the general purpose search system 300a does so at 4, and the special purpose search system 300b receives the search query 210, 212 from the general purpose search system 300a and processes the search query 210, 212. In some implementations, the special purpose search system 300b receives the search query 210, 212 directly from the user device 200, rather than the general purpose search system 300a. For example, the recommendation device 400 may instruct the user device 200 to send the search query 210, 212 directly to the special purpose search system 300b (bypassing the general purpose search system 300a).

At 5, the special purpose search system 300b returns special purpose search results 220b to the general purpose search system 300a for inclusion in the general purpose search results 220a of the general purpose search system 300a. The general purpose search system 300a may decide whether to include all, a portion of, or none of the special purpose search results 220b in the general purpose search results 220a. At 6, the general purpose search system 300a returns search results 220, i.e., the general purpose search results 220a (including the special purpose search results 220b) to the user device 200.

In some implementations, at 3 and 4, rather than having the general purpose search system 300a send/not send the search query 210, 212 to the special purpose search system 300b, the recommendation device 400, based on its own recommendation 402, either sends or does not send the search query 210, 212 to the special purpose search system 300b. In this implementation, the general purpose search system 300a does not send the search query 210, 212 to the special purpose search system 300b, at 4, based on a positive recommendation 402. Instead, when the recommendation 402 is positive, the general purpose search system 300a waits for the special purpose search results 220b for inclusion in, or modification of the search results 220. Moreover, if the general purpose search system 300a receives a negative recommendation 402, the general purpose search system 300a may not anticipate receiving any special purpose search results 220b, and so only returns the general purpose search results to the user device 200, at 5.

While in some examples, the general purpose search system 300a is the only portion of the search system 300 communicating directly with the user device 200; in other examples, recommendation device 400 and/or the special purpose search system 300b interacts with the user device 200 as well. For example, in some circumstances, the search results 220, 220a, 220b might contain images or other information, which might be sent (by request) from the special purpose search system 300b to the user device 200. Moreover, in examples where the user device 200 can send the search query 210, 212 directly to the special purpose search system 300b (e.g., as instructed by the recommendation device 400), the special purpose search system 300b may return the special purpose search results 220b directly to the user device 200 (e.g., bypassing the general purpose search system 300a). The special purpose search system 300b may deliver the special purpose search results 220b in a container, such as an hyper-text markup language (HTML) document that can be embedded in another HTML document (e.g., via an iFrame) or a Java script objection notation (JSON) object, allowing the special purpose search system 300b to render the special purpose search results 220b to the user device 200. In additional examples, the special purpose search results 220b may contain one or more links directing the user device back to the special purpose search system 300b.

A search system 300 may implement a search based on a search query 212 including search criteria received from a user device 200. The search system 300 generates search results 220 in response to the received search query 212 and transmits the search results 220 to the user device 200. Application search results may include various access mechanisms 202 for accessing applications 204 or functionality of applications 204 relevant to the search query 212 of the user 10. In response to selection of an access mechanism 202, the user device 200 may launch an application 204 referenced in the application access mechanism 202 and perform the one or more operations indicated in the application access mechanism 202. The search system 300 may collectively include both the general purpose search system 300a and the special purpose search system 300b.

Referring again to FIG. 2A, the user device 200 can be any computing device capable of providing queries 210, 212 to a search system 300. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 224. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 224 running on the user device 200 may include, but is not limited to, one of ANDROID®, IOS®, or WINDOWS PHONE®. In an example where a user device is a laptop or desktop computing device, the user device may run an operating system including, but not limited to, MICROSOFT WINDOWS® by Microsoft Corporation, MAC OS®) by Apple, Inc., or Linux. User devices 200 may also access the search system 300 while running operating systems 224 other than those operating systems 224 described above, whether presently available or developed in the future.

A software application 204 may refer to computer software that, when executed by a computing device, causes the computing device to perform a task. In some examples, a software application 204 may be referred to as an "application", an "app", or a "program". Example software applications 204 include, but are not limited to, word processing applications, spreadsheet applications, messaging applications, media streaming applications, social networking applications, and games.

Applications 204 can be executed on a variety of different user devices 200. In some examples, a native application 204a may be installed on a user device 200 prior to a user 10 purchasing the user device 200. In other examples, the user 10 may download and install native applications 204a on the user device 200.

The functionality of an application 204 may be accessed on the computing device 200 on which the application 204 is installed. Additionally or alternatively, the functionality of an application 204 may be accessed via a remote computing device 112. In some examples, all of an application's functionality is included on the computing device 112, 200 on which the application 204 is installed. These applications 204 may function without communication with other computing devices 112, 200 (e.g., via the Internet). In other examples, an application 204 installed on a computing device 200 may access information from other remote computing devices 112 during operation. For example, a weather application installed on a computing device 200 may access the latest weather information via the Internet and display the accessed weather information to the user 10 through the installed weather application. In still other examples, a web-based application 204b (also referred to herein as a web application) may be partially executed by the user's computing device 200 and partially executed by a remote computing device 112. For example, a web application 204b may be an application 204 that is executed, at least in part, by a web server and accessed by a web browser (e.g., a native application 204a) of the user's computing device 200. Example web applications 204b may include, but are not limited to, web-based email, online auctions, and online retail sites.

In general, the user device 200 may communicate with a search system 300 using any software application 204 that can transmit search queries 212 to the search system 300. In some examples, the user device 200 runs a native application 204a that is dedicated to interfacing with the search system 300, such as a native application 204a dedicated to searches (e.g., a search application 216). In some examples, the user device 200 communicates with the search system 300 using a more general application 204, such as a web-browser application 204b accessed using a web browser native application 204a. Although the user device 200 may communicate with the search system 300 using the native search application 216 and/or a web-browser application 204b, the user device 200 may be described hereinafter as using the native search application 216 to communicate with the search system 300. In some implementations, the functionality attributed to the search application 216 may be included as a searching component of a larger application 204 that has additional functionality. For example, the functionality attributed to the search application 216 may be included as part of a native application 204a or a web application 204b as a feature that provides search capabilities.

In some implementations, the special purpose search system 300b is an application search system 300b that includes a search module 310 in communication with a search data store 320. The search data store 320 may include one or more databases, indices (e.g., inverted indices), tables, files, or other data structures which may be used to implement the techniques of the present disclosure. The search module 310 receives a query wrapper 210 and generates search results 220 based on the data included in the data store 320. In some implementations, the search module 310 receives a query wrapper 210 from the user device 200 (via the general purpose search system 300a) and performs a search for function records 330 included in the search data store 320 based on data included in the query wrapper 210, such as a search query 212. The function records 330 include one or more access mechanisms 202 that the user device 200 can use to access different functions for a variety of different applications, such as native applications 204a installed on the user device 200. The search module 310 transmits search results 220 including a list of access mechanisms 202 to the user device 200 that generated the query wrapper 210.

Figure 2B:
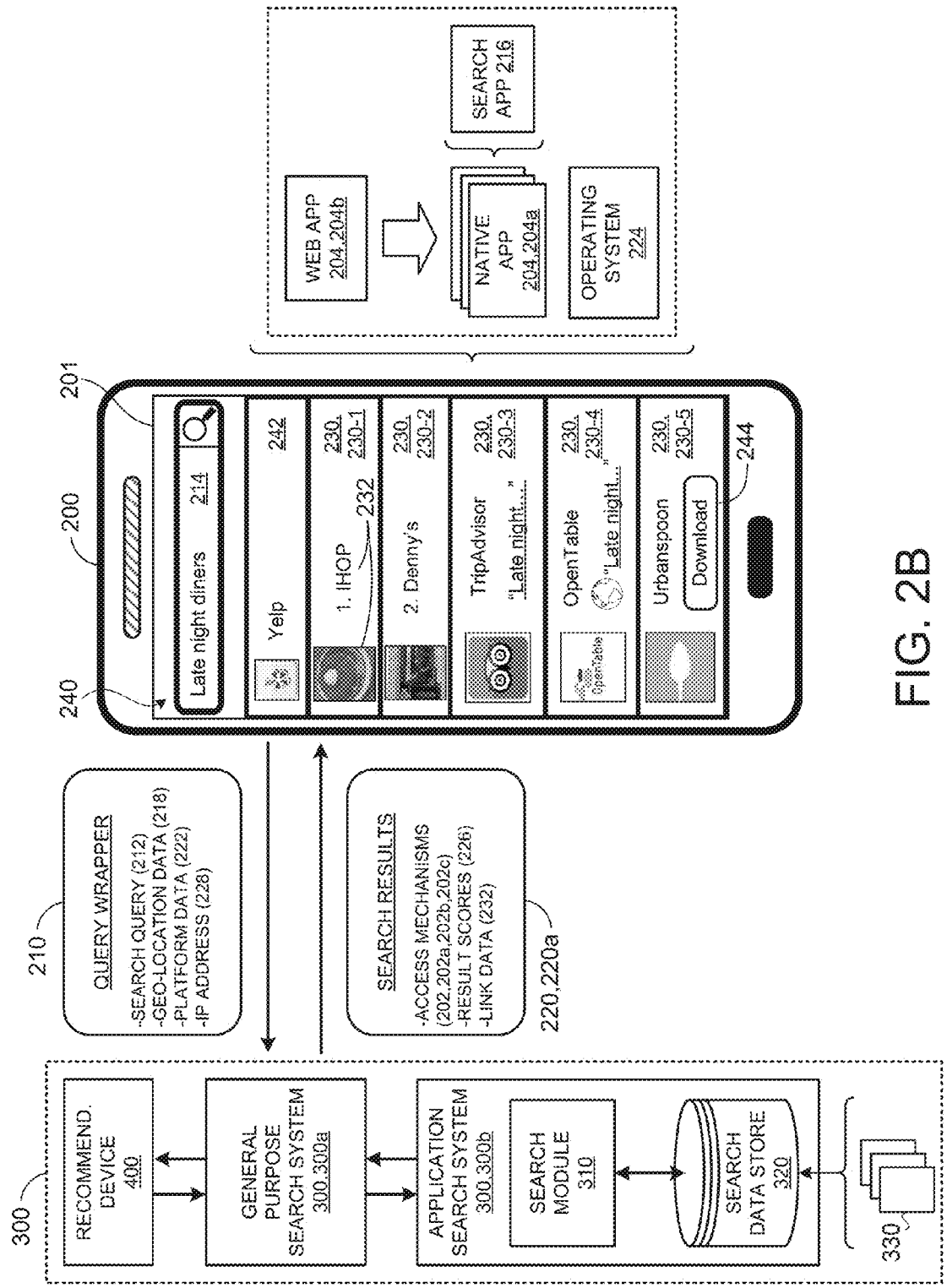
FIG. 2B is a schematic view of an example user device in communication with a search system having a general purpose search system, a special purpose search system, and a recommendation device.

The user device 200 generates user selectable links 230 based on the received search results 220 (e.g., links 230-1, 230-2, . . . , 230-5 of FIG. 2B). Each user selectable link 230 displayed to the user 10 may include an access mechanism 202. The user 10 may select a user selectable link 230 on the user device 200 by interacting with the link 230 (e.g., touching or clicking the link). In response to selection of a link 230, the user device 200 may launch a corresponding software application 204 (e.g., a native application 204a or a web-browser application 204b) referenced by the access mechanism 202 and perform one or more operations indicated in the access mechanism 202.

Access mechanisms 202 may include at least one of a native application access mechanism 202a (hereinafter "application access mechanism"), a web access mechanism 202b, and an application download mechanism 202c. The user device 200 may use the access mechanisms 202 to access functionality of applications 204. For example, the user 10 may select a user selectable link 230 including an access mechanism 202 in order to access functionality of an application 204 indicated in the user selectable link 230. The search module 310 may transmit one or more application access mechanisms 202a, one or more web access mechanisms 202b, and one or more application download mechanisms 202c to the user device 200 in the search results 220.

An application access mechanism 202a may be a string that includes a reference to a native application 204a and indicates one or more operations for the user device 200 to perform. If a user 10 selects a user selectable link 230 including an application access mechanism 202a, the user device 200 may launch the native application 204a referenced in the application access mechanism 202a and perform the one or more operations indicated in the application access mechanism 202a.

An application access mechanism 202a includes data that the user device 200 can use to access functionality provided by a native application 204a. For example, an application access mechanism 202a can include data that causes the user device 200 to launch a native application 204a and perform a function associated with the native application 204a. Performance of a function according to the access mechanism 202 may set the native application 204a into a specified state. Accordingly, the process of launching a native application 204a and performing a function according to an application access mechanism 202a may be referred to herein as launching the native application 204a and setting the native application 204a into a state that is specified by the application access mechanism 202a. In some examples, an application access mechanism 202a for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism 202a for an internet media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms 202a may have various different formats and content. The format and content of an application access mechanism 202a may depend on the native application 204a with which the application access mechanism 202 is associated and the operations that are to be performed by the native application 204a in response to selection of the application access mechanism 202a. For example, an application access mechanism 202a for an internet music player application may differ from an application access mechanism 202a for a shopping application. An application access mechanism 202a for an internet music player application may include references to musical artists, songs, and albums, for example. The application access mechanism 202a for an internet music player application may also reference operations, such as randomizing a list of songs and playing a song or album. An application access mechanism 202a for a shopping application may include references to different products that are for sale. The application access mechanism 202a for the shopping application may also include references to one or more operations, such as adding products to a shopping cart and proceeding to a checkout.

The search system 300, 300a, 300b may transmit additional data in the search results 220 along with the application access mechanisms 202a. For example, the search system 300 may transmit data (e.g., text and/or images) which may be used by the user device 200 to generate user selectable links 230 in the search results 220. A link 230 may include text and/or images that the user 10 may select (e.g., touch) via a user interface 240 displayed on a screen 201 (e.g., a display or touch screen) of the user device 200. Each user selectable link 230 may be associated with an application access mechanism 202a such that when the user 10 selects a link 230, the user device 200 launches the native application 204a referenced in the application access mechanism 202a and performs the one or more operations indicated in the application access mechanism 202a. The text and/or images of a link 230 displayed to the user 10 may indicate the operations that will be performed in response to selection of the link 230. For example, if the link 230 is to a song in a music playing application, the text and/or images may identify the music application that will be launched by the user device 200 and the song that will be played by the music playing application when the user 10 selects the link 230.

The GUI 240 may include indicators or icons 244 that indicate whether a native application 204a is currently installed on the user device 200. The indicators or icons 244 may indicate that whether the native application 204a is installed and ready for access by the user 10, or whether the native application 204a is not yet installed, thus inaccessible by the user 10, but can be downloaded to the user device 200. For example, an "Open" icon 244 may indicate that a native application 204a is installed on the user device 200, and the user may select (e.g., touch) an "Open" icon 244 to open the installed native application 204a. Displaying the icon 244 indicating the installation status of the native application 204a in the header 242 is not required for the header 242 to act as a link. In some examples, the header 242 may act as a link that opens the native application 204a even though the header 242 does not include any indicator 244. Moreover, selecting the header 242 can cause more than just opening an application 204. In some examples, the header 242 may be a link to a different state of the corresponding application 204 (e.g., different from the default state). Also, selecting the header 242 may cause the native application 204a (i.e., the one identified in the header 242) to perform a search using one or more terms of the original search query 212.

A "Free" icon 244 may indicate that the native application 204a is not currently installed on the user device 200; however, the user may select the "Free" icon 244 to launch a digital distribution platform 130b, such as an application marketplace, that provides the native application 204a for download or to automatically start downloading the native application 204a to the user device 200. Other indicators or icons 244 are possible as well that show various states of installation and/or accessibility of native applications 204a.

The user 10 may select a link 230 to cause the user device 200 to launch the native application 204a identified in the link 230 and perform one or more operations according to the application access mechanism 202a associated with the link 230. Put another way, when the user 10 selects a link 230, the user device 200 launches a native application 204a and sets the native application 204a into a state defined by the application access mechanism 202a associated with the link. In general, a state of a native application 204a may refer to the operations and/or the resulting outcome of the native application 204a in response to selection of a link 230. A state of a native application 204a may also be referred to herein as an "application state."

An application state specified by an application access mechanism 202a may depend on the functionality provided by the native application 204a. For example, if a native application 204a is configured to retrieve and display information from the Internet, the native application 204a can be set into a state in which the native application 204a retrieves information from the Internet and displays information to the user 10. In another example, if a native application 204a is configured to play media (e.g., music and/or video) from the Internet, the native application 204a can be set into a state in which the native application 204a is playing a song or a movie from the Internet. In another example, if a native application 204a is configured to make restaurant reservations, the native application 204a can be set into a state in which the native application 204a displays available restaurant reservations to the user 10.

A web access mechanism 202b may include a resource identifier that includes a reference to a web resource (e.g., a page of a web application/website). For example, a web access mechanism 202b may include a uniform resource locator (URL) (i.e., a web address) used with hypertext transfer protocol (HTTP). If a user 10 selects a user selectable link 230 including a web access mechanism 202*b*, the user device 200 may launch the web browser application 204*b* and retrieve the web resource indicated in the resource identifier. Put another way, if a user 10 selects a user selectable link 230 including a web access mechanism 202*b*, the user device 200 may launch a corresponding web-browser application 204*b* and access a state (e.g., a page) of a web application/website. In some examples, web access mechanisms 202*b* include URLs for mobile-optimized sites and/or full sites.

The web access mechanism 202*b* included in a function record 330 may be used by a web browser to access a web resource that includes similar information and/or performs similar functions as would be performed by a native application 204*a* that receives an application access mechanism 202*a* of the function record 330. For example, the web access mechanism 202*b* of a function record 330 may direct the web-browser application 204*b* of the user device 200 to a web version of the native application 204*a* referenced in the application access mechanisms 202*a* of the function record 330. Moreover, if the application access mechanisms 202 included in a function record 330 for a specific Mexican restaurant cause each application edition to retrieve information for the specific Mexican restaurant, the web access mechanism 202*b* may direct the web-browser application 204*b* of the user device 200 to a web page entry for the specific Mexican restaurant.

An application download mechanism 202*c* may indicate a location (e.g., a digital distribution platform 130*b*) where a native application 204*a* can be downloaded in the scenario where the native application 204*a* is not installed on the user device 200. If a user 10 selects a user selectable link 230 including an application download mechanism 202*a*, the user device 200 may access a digital distribution platform from which the referenced native application 204*a* may be downloaded. The user device 200 may access a digital distribution platform 130*b* using at least one of the web-browser application 204*b* and one of the native applications 204*a*.

The search module 310 is configured to receive a query wrapper 210 from the user device 200 or the general purpose search system 300*a* via the network 120. A query wrapper 210 may include a search query 212, which may include text, numbers, and/or symbols (e.g., punctuation) entered into the user device 200 by the user. For example, the user 10 may enter the search query 212 into a search field 214 (e.g., a search box) of a graphical user interface (GUI) 240 of a search application 216 running on the user device 200. A user may enter a search query 212 using a touchscreen keypad, a mechanical keypad, a speech-to-text program, or other form of user input. In general, a search query 212 may be a request for information retrieval (e.g., search results) from the search system 300. For example, a search query 212 may be directed to retrieving a list of links 230 to application functionality or application states in examples where the search system 300 is configured to generate a list of access mechanisms 202 as search results 220. A search query 212 directed to retrieving a list of links 230 to application functionality may indicate a user's desire to access functionality of one or more applications described by the search query.

The query wrapper 210 may include additional data along with the search query 212. For example, the query wrapper 210 may include geo-location data 218 that indicates the location of the user device 200, such as latitude and longitude coordinates. The user device 200 may include a global positioning system (GPS) receiver that generates the geo-location data 218 transmitted in the query wrapper 210. The query wrapper 210 may also include an IP address 228, which the search module 310 may use to determine the location of the user device 200. In some examples, the query wrapper 210 may also include additional data, including, but not limited to, platform data 222 (e.g., version of the operating system 224, device type, and web-browser version), an identity of a user of the user device 200 (e.g., a username), partner specific data, and other data.

The search module 310 can use the search query 212 and the additional data included in the query wrapper 210 to generate the search results 220. For example, the search module 310 can determine a geo-location of the user device 200, which the search module 310 can use along with the search query 212 to generate the search results 220. The search module 310 can determine the geo-location of the user device 200 based on the geo-location data 218 or other data (e.g., IP address 228) included in the query wrapper 210. In some implementations, the search module 310 detects a location (e.g., a postal address, street name, city name, etc.) specified in the search query 212 (i.e., a query-specified location). In these implementations, the search module 310 can use the query-specified location along with the search query 212 to generate the search results 220.

The search module 310 performs a search for function records 330 included in the search data store 320 in response to the received query wrapper 210 (e.g., in response to the search query 212 and the geo-location data 218). In some implementations, the search module 310 generates result scores 226 for function records 330 identified during the search. The result score 226 associated with a function record 330 may indicate the relevance of the function record 330 to the search query 212. A higher result score 226 may indicate that the function record 330 is more relevant to the search query 212. The search module 310 may retrieve access mechanisms 202 from the scored function records 330. The search module 310 can transmit a result score 226 along with an access mechanism 202 retrieved from a scored function record 330 in order to indicate the rank of the access mechanism 202 among other transmitted access mechanisms 202.

An application access mechanism 202*a* included in a function record 330 may be an application resource identifier or a string that includes a reference to a native application 204*a* and/or indicates one or more operations for execution by the native application 204*a* on the user device 200. An application resource identifier may be a string having an application specific scheme in some examples. For example, the application resource identifier may include a reference to a native application 204*a*, a domain name, and a path to be used by the native application 204*a* to retrieve and display information to the user 10. In some examples, an application resource identifier is an application specific resource identifier that is defined by the developer of the application 204. In this example, the search application 216 receives the application resource identifier and the operating system 224 may send the application resource identifier to the native application 204*a* referenced in the application resource identifier. The native application 204*a* referenced in the application resource identifier launches and is set into the state specified by the application resource identifier.

In some examples, the application access mechanism 202*a* includes operations for the user device 200 to perform in addition to the operation(s) indicated in the application resource identifier. For example, the search application 216, the operating system 224, and/or a native application 204*a* on the user device 200 may perform the operations included in the application access mechanism 202a. In some examples, a script includes the operations. Examples of operations may include, but are not limited to, launching a native application 204a, creating and sending a search request 212 (via a search wrapper 210) to an application server 112, setting a current geographic location in a native application 204a, making a restaurant reservation, sending a text message, and adding an appointment to a calendar.

In some examples, an application access mechanism 202a may not include an application resource identifier. Instead, the application access mechanism 202a includes one or more operations that reference a native application 204a and indicate one or more operations for execution by the user device 200. The one or more operations may include instructions for at least one of the search application 216, the operating system 224, and/or a native application 204a on the user device 200. In response to selection of the application access mechanism 202a, the user device 200 may perform the operations included in the application access mechanism 202a. In some examples, the operations may be included in a script.

In some examples, an application function may not be accessible using an application resource identifier. For example, a function of the application may not include a corresponding application resource identifier that the application 204 may use to perform the function. As another example, some applications 204 may not be configured to receive application resource identifiers. In these examples, an application access mechanism 202 for the native application 204a can include one or more operations that cause the native application to perform the function that may not otherwise be accessible using an application resource identifier. For example, the search application 216 may receive the one or more operations and execute the one or more operations to set the native application 204a into the desired application state. In some examples, the one or more operations may include launching the native application 204a along with additional operations for the native application 204a to perform. For example, the search application 216 may initially trigger the native application 204a to start and then wait for a period of time for the native application 204a to start. Then the search application 216 may perform additional operations included in the received application access mechanism 202, such as issuing a search instruction to the native application 204a.

In still other examples, a native application 204a may be configured to directly receive the operations transmitted by the search system 100. In these examples, the native application 204a may be launched according to the application access mechanism 202 and then the launched native application 204a may directly perform the operations received from the search system 100.

A single native application 204a can provide a variety of different functionalities. For example, a restaurant reservation application can access reviews for a variety of different restaurants and set up reservations at a variety of different restaurants. Similarly, a travel application can book hotels, book flights, and provide reviews for different travel destinations. The different functionalities associated with a single native application may be accessed using a plurality of different application access mechanisms. For example, with respect to the restaurant reservation application, the search data store 320 may include function records 330 having different application access mechanisms 202 for accessing different restaurant reviews and setting up reservations. Similarly, the search data store 320 may include function records 330 having different application access mechanisms 202 for booking hotels, booking flights, and accessing reviews for different travel destinations.

The application access mechanisms 202 for a single native application 204a may vary in complexity. In some examples, the application access mechanisms 202 may cause a native application 204a to launch (e.g., the operating system 224 may be instructed to launch the application 204) and then perform additional operations after launching, as described above. In other examples, application access mechanisms 202 may cause an application 204 to launch into a default state (e.g., a default homepage) without performing any additional operations. A function record 330 including an application access mechanism 202 that causes an application 204 to launch into a default state may be thought of as an access mechanism 202 that is related to the native application 204a, but not any particular state which may be accessed by the application 204.

The search module 310 may transmit additional data to the user device 200 along with the access mechanisms 202 and the result score(s) 226. For example, the search module 310 may transmit data (e.g., text and/or images) to be included in the user selectable links 230. Data for the user selectable links 230 (e.g., text and/or images) may be referred to herein as "link data" (e.g., link data 230). The user device 200 displays the user selectable links 230 to the user 10 based on received link data 230. Each user selectable link 230 may be associated with an access mechanism 202 included in the search results 220, such that when a user 10 selects a link 230, the user device 200 launches the application 204 referenced in the access mechanism 202 and sets the application 204 into the state specified by the access mechanism 202.

With reference to FIG. 2B, the user device 200 may receive a set of search results 220 from the search module 310 or the general purpose search system 300a in response to transmission of the query wrapper 210 to the search system 300. The GUI 240 of the search application 216 displays (e.g., renders) the search results 220 received from the search module 310. The search application 216 may display the search results 220 to the user in a variety of different ways, depending on what information is transmitted to the user device 200. In examples where the search results 220 include a list of access mechanisms 202 and link data 232 associated with the access mechanisms 202, the search application 216 may display the search results 220 to the user 10 as a list of user selectable links 230 including text and images. The text and images in the links 230 may include application names associated with the access mechanisms 202, text describing the access mechanisms 202, images associated with the application 204 referenced by the access mechanisms 202 (e.g., application icons), and images associated with the application state (e.g., application screen images) defined by the access mechanisms 202.

In some implementations, the search application 216 displays the search results 220 as a list of links 230 arranged under the search field 214 in which the user 10 entered the search query 212. Moreover, the search application 216 may arrange the links 230 in order based on result scores 226 associated with the access mechanisms 202 included in the links 230. In some examples, the search application 216 groups the links 230 together if the links 230 are related to the same application 204 (e.g., a native application 204a).

Each of the links 230 includes link data 232. For example, each of the links 230 includes an image (e.g., an icon) and text (e.g., an application or business name) that may describe an application and a state of an application. Each of the links 230 may include an access mechanism so that if a user selects one of links 230, the user device 200 launches the application and sets the application into a state that is specified by the access mechanism associated with the selected link. In some implementations, the user device 200 may arrange the links 230 based on result scores associated with the access mechanisms included in the links 230. In some implementations, as illustrated in FIG. 2B, links 230 for the same application 204 may be combined together in the search results 220 displayed to the user 10.

With respect to FIG. 2B, it may be assumed that the native application 204a for YELP® developed by Yelp, Inc., and the native application 204a for TRIPADVISOR® developed by TripAdvisor, Inc., are installed on the user device 200. Links 230-1, 230-2 and link 230-3 reference the YELP® native application and the TRIPADVISOR® native application, respectively. The GUI 240 includes a header 242, including the name "Yelp," under which the links 230-1, 230-2 are arranged. The header 242 may indicate that the links 230-1, 230-2 arranged below the header 242 are associated with the YELP® native application 204a. Selection of link 230-1 may cause the user device 200 to launch the YELP® native application 204a and retrieve an IHOP® restaurant entry of the YELP® native application 204a. Selection of link 230-2 may cause the user device 200 to launch the YELP® native application 204a and retrieve a DENNY'S® restaurant entry of the YELP® native application 204a. Selection of link 230-3 may cause the user device 200 to launch the TRIPADVISOR® native application 204a and retrieve an entry for "Late night diners" in the TRIPADVISOR® native application 204a (e.g., a search for "Late night diners").

Link 230-4 includes a web access mechanism 202b (e.g., a URL). Selection of link 230-4 may cause the user device 200 to launch the web-browser application 204b and retrieve an entry for "Late night diners" in the OPENTABLE® web-browser application 204b developed by OpenTable, Inc. Link 230-5 includes an application download mechanism 202c for the URBANSPOON® native application 204a by InterActiveCorp. Selection of link 230-5 may cause the user device 200 to access a digital distribution platform 130b (FIG. 1B) from which the URBANSPOON® native application 204a can be downloaded and/or previewed. The search module 310 can be configured to transmit any combination of application access mechanisms 202a, web access mechanisms 202b, and application download mechanisms 202c in the search results 220.

In some examples, user devices 200 communicate with the search system 300 via a partner computing system (not illustrated). The partner computing system may be a computing system of a third party that may leverage the search functionality of the search system 300. The partner computing system may belong to a company or organization other than that which operates the search system 300. Example third parties which may leverage the functionality of the search system 300 may include, but are not limited to, internet search providers and wireless communications service providers. The user devices 200 may send search queries to the search system 300 and receive search results via the partner computing system. The partner computing system may provide a user interface to the user devices 200 in some examples and/or modify the search experience provided on the user devices 200.

FIG. 1B shows a plurality of data sources 130. The data sources 130 may be sources of data which the search system 300 (e.g., the search module 310) may use to generate and update the data store 320. The data retrieved from the data sources 130 can include any type of data related to application functionality and/or application states. Data retrieved from the data sources 130 may be used to create and/or update one or more databases, indices, tables (e.g., an access table), files, or other data structures included in the data store 320. For example, function records 330 may be created and updated based on data retrieved from the data sources 130. In some examples, some data included in a data source 130 may be manually generated by a human operator. Data included in the function records 330 may be updated over time so that the search system 300 provides up-to-date results.

The data sources 130 may include a variety of different data providers. The data sources 130 may include data from application developers 130a, such as application developers' websites and data feeds provided by developers. The data sources 130 may include operators of digital distribution platforms 130b configured to distribute native applications 204a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

The search system 300 retrieves data from one or more of the data sources 130. The data retrieved from the data sources 130 can include any type of data related to application functionality and/or application states. The search system 300 generates function records 330 based on the data retrieved from the data sources 130. In some examples, a human operator manually generates some data included in the function records 330. The search system 300 may update data included in the function records 330 over time so that the search system 300 provides up-to-date results 220.

Figure 3B:
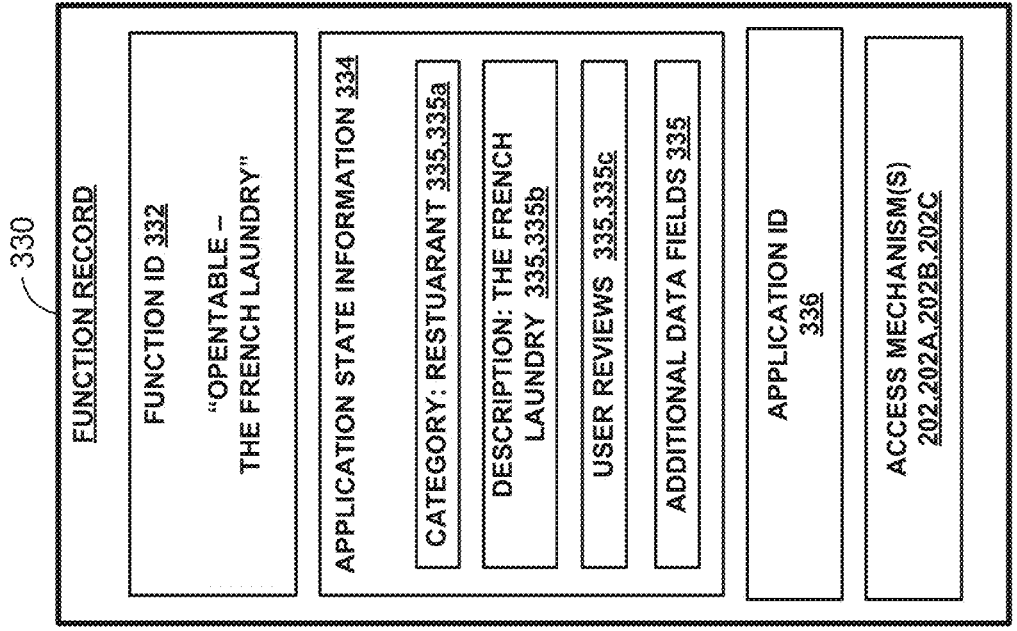
FIGS. 3A and 3B are schematic views of example function records.
Figure 3A:
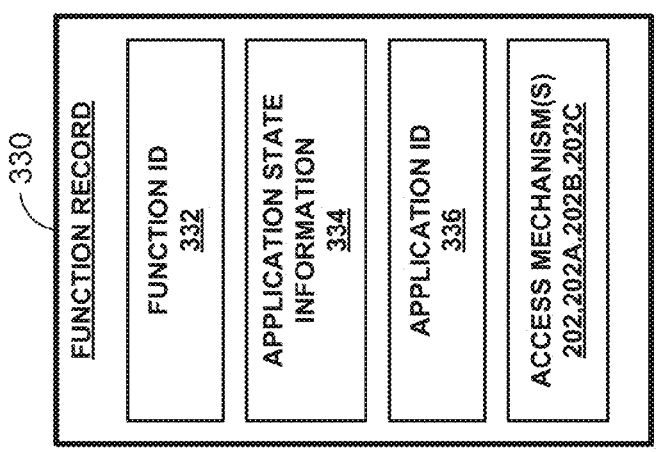

Referring to FIGS. 3A and 3B, the search data store 320 includes a plurality of different function records 330. Each function record 330 may include data related to a function of an application 204 and/or the state of the application 204 resulting from performance of the function. A function record 330 may include a function identifier (ID) 332, application state information 334, an application identifier (ID) 336, and one or more access mechanisms 202, 202a, 202b, 202c used to access functionality provided by an application 204.

The function ID 332 may be used to identify the function record 330 among the other function records 330 included in the search data store 320. The function ID 332 may be a string of alphabetic, numeric, and/or symbolic characters (e.g., punctuation marks) that uniquely identifies the associated function record 330. In some examples, the function ID 332 describes a function and/or an application state in human readable form. For example, the function ID 332 may include the name of the application 204 referenced in the access mechanism(s) 202. In a specific example, a function ID 332 for an internet music player application may include the name of the internet music player application along with the song name that will be played when the internet music player application is set into the state defined by the application access mechanism included in the function record. Additionally or alternatively, the function ID 332 may be a human readable string that describes a function performed according to the access mechanism(s) 202 and/or an application state resulting from performance of the function according to the access mechanism(s) 202. In some examples, the function ID 332 includes a string in the format of a uniform resource locator (URL) of a web access mechanism 202b for the function record 330, which may uniquely identify the function record 330.

In a more specific example, if the function record 330 describes a function of the YELP® native application, the function ID 332 may include the name "Yelp" along with a description of the application state described in the application state information 334. For example, the function ID 332 for a function record 330 that describes the restaurant named "The French Laundry" may be "Yelp—The French Laundry." In an example where the function ID 332 includes a string in the format of a URL, the function ID 332 may include the following string "http://www.yelp.com/bizthe-french-laundry-yountville-2?ob=1" to uniquely identify the function record 330. In additional examples, the function ID 332 may include a URL using a namespace other than "http://," such as "func://," which may indicate that the URL is being used as a function ID in a function record. For example, the function ID 332 may include the following string "func://www.yelp.com/biz/the-french-laundry-yountville-2?ob=1."

The application state information 334 may include data that describes an application state into which an application 204 is set according to the access mechanism(s) 202 in the function record 330. Additionally or alternatively, the application state information 334 may include data that describes the function performed according to the access mechanism(s) 202 included in the function record 330. The application state information 334 can include text, numbers, and symbols that describe the application state. The types of data included in the application state information 334 may depend on the type of information associated with the application state and the functionality specified by the application access mechanism 202a. The application state information 334 may include a variety of different types of data, such as structured, semi-structured, and/or unstructured data. The application state information 334 may be automatically and/or manually generated based on documents retrieved from the data sources 130. Moreover, the application state information 334 may be updated so that up-to-date search results 220 can be provided in response to a search query 212.

In some examples, the application state information 334 includes data that may be presented to the user 10 by an application 204 when the application 204 is set in the application state defined by the access mechanism(s) 202. For example, if one of the access mechanism(s) 202 is an application access mechanism 202a, the application state information 334 may include data that describes a state of the native application 204a after the user device 200 has performed the one or more operations indicated in the application access mechanism 202a. For example, if the function record 330 is associated with a shopping application, the application state information 334 may include data that describes products (e.g., names and prices) that are shown when the shopping application is set to the application state defined by the access mechanism(s) 202. As another example, if the function record 330 is associated with a music player application, the application state information 334 may include data that describes a song (e.g., name and artist) that is played when the music player application is set to the application state defined by the access mechanism(s) 202.

The types of data included in the application state information 334 may depend on the type of information associated with the application state and the functionality defined by the access mechanism(s) 202. For example, if the function record 330 is for an application 204 that provides reviews of restaurants, the application state information 334 may include information (e.g., text and numbers) related to a restaurant, such as a category of the restaurant, reviews of the restaurant, and a menu for the restaurant. In this example, the access mechanism(s) 202 may cause the application 204 (e.g., a native application 204a or a web-browser application 204b) to launch and retrieve information for the restaurant. As another example, if the function record 330 is for an application 204 that plays music, the application state information 334 may include information related to a song, such as the name of the song, the artist, lyrics, and listener reviews. In this example, the access mechanism(s) 202 may cause the application 204 to launch and play the song described in the application state information 334.

The search system 300 may generate application state information 334 included in a function record 330 in a variety of different ways. In some examples, the search system 300 retrieves data to be included in the application state information 334 via partnerships with database owners and developers of native applications 204a. For example, the search system 300 may automatically retrieve the data from online databases 130f that include, but are not limited to, data related to movies, television programs, music, and restaurants. In some examples, a human operator manually generates some data included in the application state information 334. The search system 300 may update data included in the application state information 334 over time so that the search system 300 provides up-to-date results 220.

The application ID 336 may be used to identify a native application 204a associated with the function record 330. The application ID 336 may be a string of alphabetic, numeric, and/or symbolic characters (e.g., punctuation marks) that uniquely identifies the associated native application 204a. In some examples, the application ID 336 the native application 204a in human readable form. For example, the application ID 336 may include the name of the application 204 referenced in the access mechanism(s) 202. In a specific example, the application ID 336 for a restaurant finder application 204 may include the name of the restaurant finder application.

A function record 330 including an application access mechanism 202 that causes an application 204 to launch into a default state may include application state information 334 describing the native application 204a, instead of any particular application state. For example, the application state information 334 may include the name of the developer of the application 204, the publisher of the application 204, a category 335a (e.g., genre) of the application 204, a description 335b of the application 204 (e.g., a developer's description), and the price of the application 204. The application state information 334 may also include security or privacy data about the application 204, battery usage of the application 204, and bandwidth usage of the application 204. The application state information 334 may also include application statistics. Application statistics may refer to numerical data related to a native application 204a. For example, application statistics may include, but are not limited to, a number of downloads, a download rate (e.g., downloads per month), a number of ratings, and a number of reviews.

FIG. 3B shows an example function record 330 associated with the OPENTABLE® application, developed by OpenTable, Inc. The OPENTABLE® application is a restaurant-reservation application that allows users to search for restaurants and make restaurant reservations. The OPENTABLE® application provides information about restaurants including descriptions of restaurants and user reviews of the restaurants. The example function record 330 of FIG. 3B describes an application state of the OPENTABLE® application in which the OPENTABLE® application accesses information for THE FRENCH LAUNDRY® restaurant.

The example function record 330 includes a function ID 332 of "OPENTABLE—THE FRENCH LAUNDRY," which may be used as a unique identifier to identify the function record 330. In other examples, the function ID 332 could include a URL as a unique identifier for the function record 330. For example, the function ID 332 may include the string "http:/www.opentable.com/the-french-laundry" as a unique identifier for the function record 330. As described herein, such a function ID may be included in a web access mechanism 202b of a function record 330. As another example, the function ID 332 may have a different namespace than "http://," such as "func://." In yet another example, the function ID 332 could be a string of characters, numbers, and/or symbols that are not in human readable form. Each example is optional and may be combined with other examples.

The example application state information 334 includes data fields 335, such as a category 335a of THE FRENCH LAUNDRY® restaurant, a description 335b of THE FRENCH LAUNDRY® restaurant, user reviews 335c of THE FRENCH LAUNDRY® restaurant, and additional data fields 335. The restaurant category 335a field may include the text "French cuisine" and "contemporary," for example. The description field 335b may include text that describes THE FRENCH LAUNDRY® restaurant. The user reviews field 335c may include text of user reviews for THE FRENCH LAUNDRY® restaurant. The additional data fields 335 may include additional data for THE FRENCH LAUNDRY® restaurant that may not specifically fit within the other defined fields, such as a menu for the restaurant, prices, and operating hours for the restaurant.

The function record 330 includes one or more access mechanism(s) 202. The access mechanism(s) 202 may include a reference to the OPENTABLE® application 204. An example application access mechanism 202a for the function record 330 may include a reference to the OPENTABLE® native application 204a along with one or more operations to be performed by the user device 200. For example, the application access mechanism 202a may include an application resource identifier and/or one or more operations that cause the user device 200 to access the entry for THE FRENCH LAUNDRY® restaurant in the OPENTABLE) native application. An example application resource identifier may be "vnd.opentable.deeplink://opentable.com/restaurant/profile?rid=1180&refid=1."

In some implementations, a function record 330 includes multiple different application access mechanisms 202, 202a. 202b, 202c that may include a variety of information. The application access mechanism 202 may include edition information that indicates the application edition with which the application access mechanism 202 is compatible. For example, the edition information may indicate the operating system 224 with which the application access mechanism 202 is compatible. Moreover, different application access mechanisms 202 may be associated with different editions of a native application 204a. A native application edition (hereinafter "application edition") refers to a particular implementation or variation of a native application 204a. For example, an application edition may refer to a version of a native application 204a, such as a version 1.0 of a native application 204a or a version 2.0 of a native application 204a. In another example, an application edition may refer to an implementation of a native application 204a for a specific platform, such as a specific operating system 224.

The different application access mechanisms 202 included in a function record 330 may cause the corresponding application editions to launch and perform similar functions. Accordingly, the different application access mechanisms 202 included in a function record 330 may cause the corresponding application editions to be set into similar application states. For example, if the different application access mechanisms 202 reference different editions of an information retrieval application, the different application access mechanisms 202 may cause the corresponding application editions to retrieve similar information. In another example, if the different application access mechanisms 202 reference different editions of an internet music player application, the different application access mechanisms 202 may cause the corresponding application editions to play the same song.

In some examples, a function record 330 for a native application that retrieves restaurant information may include multiple different application access mechanisms 202 for multiple different application editions. Assuming the function record 330 is associated with a specific Mexican restaurant, the application access mechanisms 202 for the different application editions may cause each application edition to retrieve information for the same specific Mexican restaurant. For example, a first application access mechanism 202 may cause a first application edition (e.g., on a first OS) to retrieve information for the specific Mexican restaurant. A second application access mechanism 202 may cause a second application edition (e.g., on a second OS) to retrieve information for the specific Mexican restaurant. In some examples, the search system 300 can determine whether to transmit the application access mechanism 202 in the search results 220 based on whether the user device 200 can handle the application access mechanism 202.

Referring also to FIG. 2B, the search system 300 (e.g., the special purpose-application search system 300b) generates search results 220 including a list of application access mechanisms 202 that are included in selected function records 330. Initially, the search system 300 analyzes the search query 212 received from the user device 200. The search system 300 then identifies a set of function records 330 based on the received search query 212. For example, the search system 300 may identify the set of function records 330 based on matches (e.g., text matches) between terms of the search query 212 and terms of the application state information 334 included in the identified function records 330.

The search system 300 processes (e.g., scores) the identified set of function records 330. For example, the search system 300 may determine how well the function records 330 match the received search query 212. The search system 300 may then select the application access mechanisms 202 from the function records 330 that best match the received search query 212. The search system 300 transmits search results 220 including the selected application access mechanisms 202 to the user device 200 that generated the search query 212. The search system 300 may also transmit additional data along with the application access mechanisms 202. For example, the search system 300 may transmit data (e.g., text and/or images) to be included in user selectable links 230.

During some searches, the search system 300 may identify one or more function records 330 that include multiple application access mechanisms 202. In these scenarios, the search system 300 may process (e.g., score) the identified set of function records 330 in the manner described above. For each identified function record 330 including multiple application access mechanisms 202, the search system 300 may select which application access mechanisms 202 to transmit to the user device 200. In some examples, the search system 300 transmits each of the application access mechanisms 202 of the identified function record 330 to the user device 200 so that the user device 200 may determine which application access mechanism 202 to use. In other examples, the search system 300 determines which of the multiple application access mechanisms 202 to transmit to the user device 200 based on information included in the query wrapper 210 received from the user device 200. For example, the search system 300 may select and transmit one or more of the application access mechanisms 202 that are likely to be compatible with the user device 200, e.g., based on a version of the operating system 224 of the user device 200.

During some searches, the search system 300 may identify one or more function records 330 that include application access mechanisms 202a and one or more web access mechanisms 202b. In these scenarios, the search system 300 may process (e.g., score) the identified set of function records 330 in the manner described above. For each identified function record 330 including application access mechanisms 202a and a web access mechanism 202b, the search system 300 may determine whether to transmit the web access mechanism 202b and the application access mechanisms 202a. In some examples, the search system may transmit the web access mechanism and each of the multiple application access mechanisms to the user device so that the user device can determine which of the access mechanisms to use. In other examples, the search system may determine whether any of the application access mechanisms should be transmitted to the user device. If the search system determines that none of the application access mechanisms are likely to be compatible with the user device, the search system can refrain from sending the application access mechanisms to the user device. Instead, the search system may transmit the web access mechanism to the user device. As described above, the user device may use a web browser to access the web resource identified in the web access mechanism.

Figure 3C:
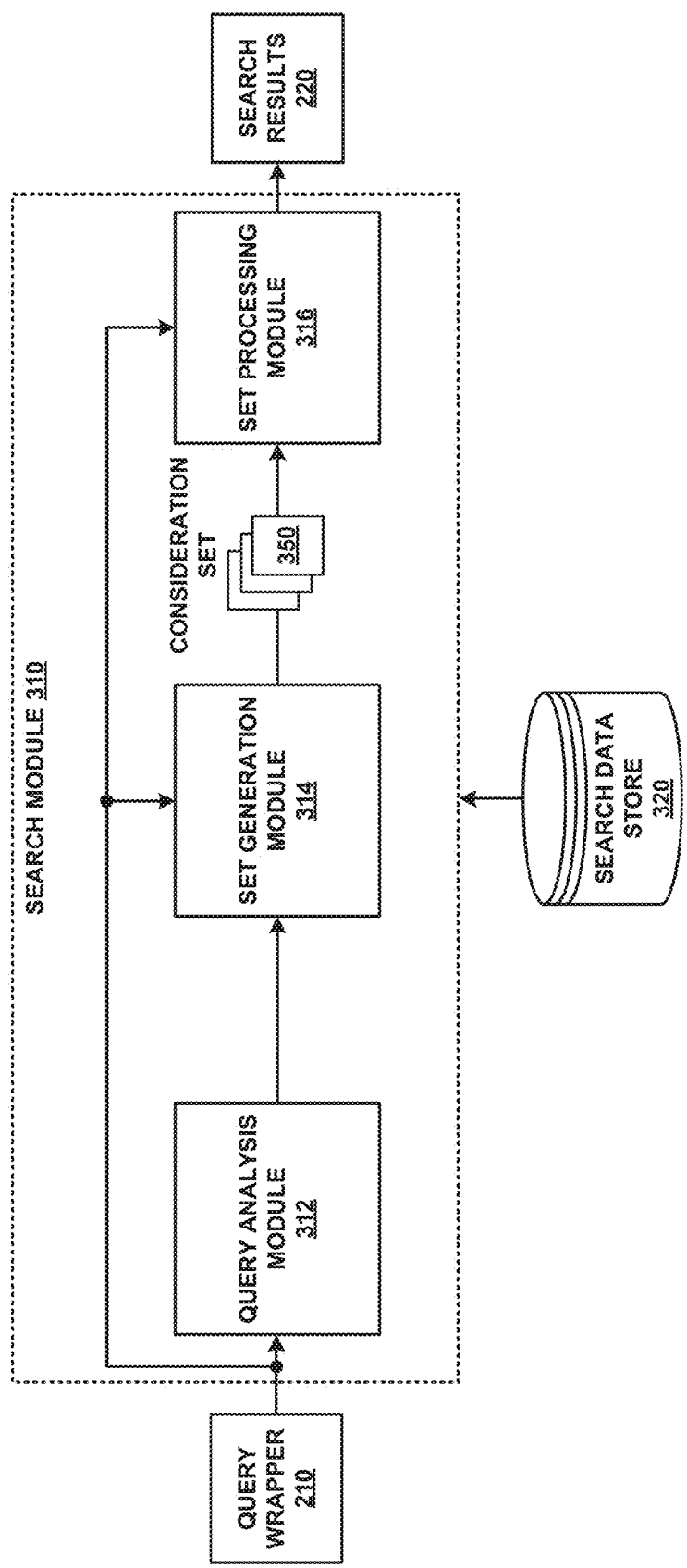
FIG. 3C is a schematic view of an example search module receiving and processing a query wrapper and outputting search results.

FIG. 3C shows an example search module 310 that includes a query analysis module 312, a consideration set generation module 314 (hereinafter "set generation module 314"), and a consideration set processing module 316 (hereinafter "set processing module 316"). The query analysis module 312 receives the query wrapper 210 and analyzes the received search query 212. The query analysis module 312 may perform various analysis operations on the received search query 212, which may include, but are not limited to, tokenization of the search query 212, filtering of the search query 212, stemming, synonymization, and stop word removal. In some implementations, the query analysis module 312 detects a query-specified location included in the search query 212.

The set generation module 314 identifies a plurality of function records 330 based on the received search query 212. In some examples, the set generation module 314 identifies the function records 330 based on matches between terms of the search query 212 and terms in the function records 330. For example, the set generation module 314 may identify the function records 330 based on matches between tokens generated by the query analysis module 312 and words included in the function records 330, such as words included in the function IDs 332 and/or the application state information 334.

The consideration set 350 of function records 330 may refer to the function records 330 that are to be scored by the set processing module 316. The set generation module 314 may determine the geo-location of the user device 200 based on data included in the query wrapper 210. In additional examples, if the query analysis module 312 detects a query-specified location, the set generation module 314 uses the query-specified location as the search location. In some examples, the set generation module 314 uses the geo-location of the user device 200 as the search location (e.g., to filter function records 330 based on location).

The set processing module 316 may score the function records 330 in the consideration set 350 in order to generate a set of search results 220. The scores 226 associated with the function records 330 may be referred to as "result scores." The set processing module 316 may determine a result score 226 for each of the function records 330 in the consideration set 350. The result scores 226 associated with a function record 330 may indicate the relative rank of the function record 330 (e.g., by the access mechanisms 202) among other function records 330. For example, a larger result score 226 may indicate that a function record 330 is more relevant to the received search query 212.

The set processing module 316 selects application access mechanisms 202 from the selected function records 330 (e.g., the highest scoring function records). The set processing module 316 transmits the selected application access mechanisms 202 to the user device 200 that generated the search query 212. The set processing module 316 may also transmit the result scores 226 associated with the selected application access mechanisms 202. For example, an application access mechanism 202 may be associated with the result score 226 of the function record 330 from which the application access mechanism 202 was selected.

The information conveyed by the search results 220 may depend on how the result scores 226 are calculated by the set processing module 316. For example, the result scores 226 may indicate the relevance of an application function or application state to the search query 212, the popularity of an application function or state, or other properties of the application function or state, depending on what parameters the set processing module 316 uses to score the function records 330.

The set processing module 316 may generate result scores 226 for function records 330 in a variety of different ways. In some implementations, the set processing module 316 generates a result score 226 for a function record 330 based on one or more scoring features. The scoring features may be associated with the function record 330 and/or the search query 212. A function record scoring feature (hereinafter "record scoring feature") may be based on any data associated with a function record 330. For example, record scoring features may be based on any data included in the application state information 334 of the function record 330. Example record scoring features may be based on metrics associated with a person, place, or thing described in the function record 330. Example metrics may include the popularity of a place described in the function record 330 and/or ratings (e.g., user ratings) of the place described in the function record 330. For example, if the function record 330 describes a song, a metric may be based on the popularity of the song described in the function record 330 and/or ratings (e.g., user ratings) of the song described in the function record 330. The record scoring features may also be based on measurements associated with the function record 330, such as how often the function record 330 is retrieved during a search and how often access mechanisms 202 of the function record 330 are selected by a user 10. Record scoring features may also be based on whether the function record 330 includes an application access mechanism 202 that leads to a default state or a deeper native application state.

A query scoring feature may include any data associated with the search query 212. For example, query scoring features may include, but are not limited to, a number of words in the search query 212, the popularity of the search query 212, and the expected frequency of the words in the search query 212. A record-query scoring feature may include any data generated based on data associated with both the function record 330 and the search query 212 that resulted in identification of the function record 330 by the set generation module 314. For example, record-query scoring features may include, but are not limited to, parameters that indicate how well the terms of the search query 212 match the terms of the application state information 334 of the identified function record 330. The set processing module 316 may generate a result score 226 for a function record 330 based on at least one of the record scoring features, the query scoring features, and the record-query scoring features.

The set processing module 316 may determine a result score 226 for a function record 330 based on one or more of the scoring features listed herein and/or additional scoring features not explicitly listed. In some examples, the set processing module 316 may include one or more machine learned models (e.g., a supervised learning model) configured to receive one or more scoring features. The one or more machine learned models may generate result scores 226 based on at least one of the record scoring features, the query scoring features, and the record-query scoring features. For example, the set processing module 316 may pair the search query 212 with each function record 330 and calculate a vector of features for each (query, record) pair. The vector of features may include one or more record scoring features, one or more query scoring features, and one or more record-query scoring features. The set processing module 316 may then input the vector of features into a machine-learned regression model to calculate a result score for the function record 330. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores 226 associated with the function records 330 (e.g., access mechanisms 202) may be used in a variety of different ways. The set processing module 316 and/or the user device 200 may rank the access mechanisms 202 based on the result scores 226 associated with the access mechanisms 202. In these examples, a larger result score may indicate that the access mechanism 202 (e.g., the function or application state) is more relevant to a user than an access mechanism 202 having a smaller result score. In examples where the user device 200 displays the search results 220 as a list, the user device 200 may display the links 230 for access mechanisms 202 having larger result scores 226 nearer to the top of the results list (e.g., near to the top of the screen). In these examples, the user device 200 may display the links 230 for access mechanisms 202 having lower result scores 226 farther down the list (e.g., off screen). In some examples, as illustrated in FIG. 2, the user device 200 groups together the links 230 associated with the same native application 204a.

Figure 4A:
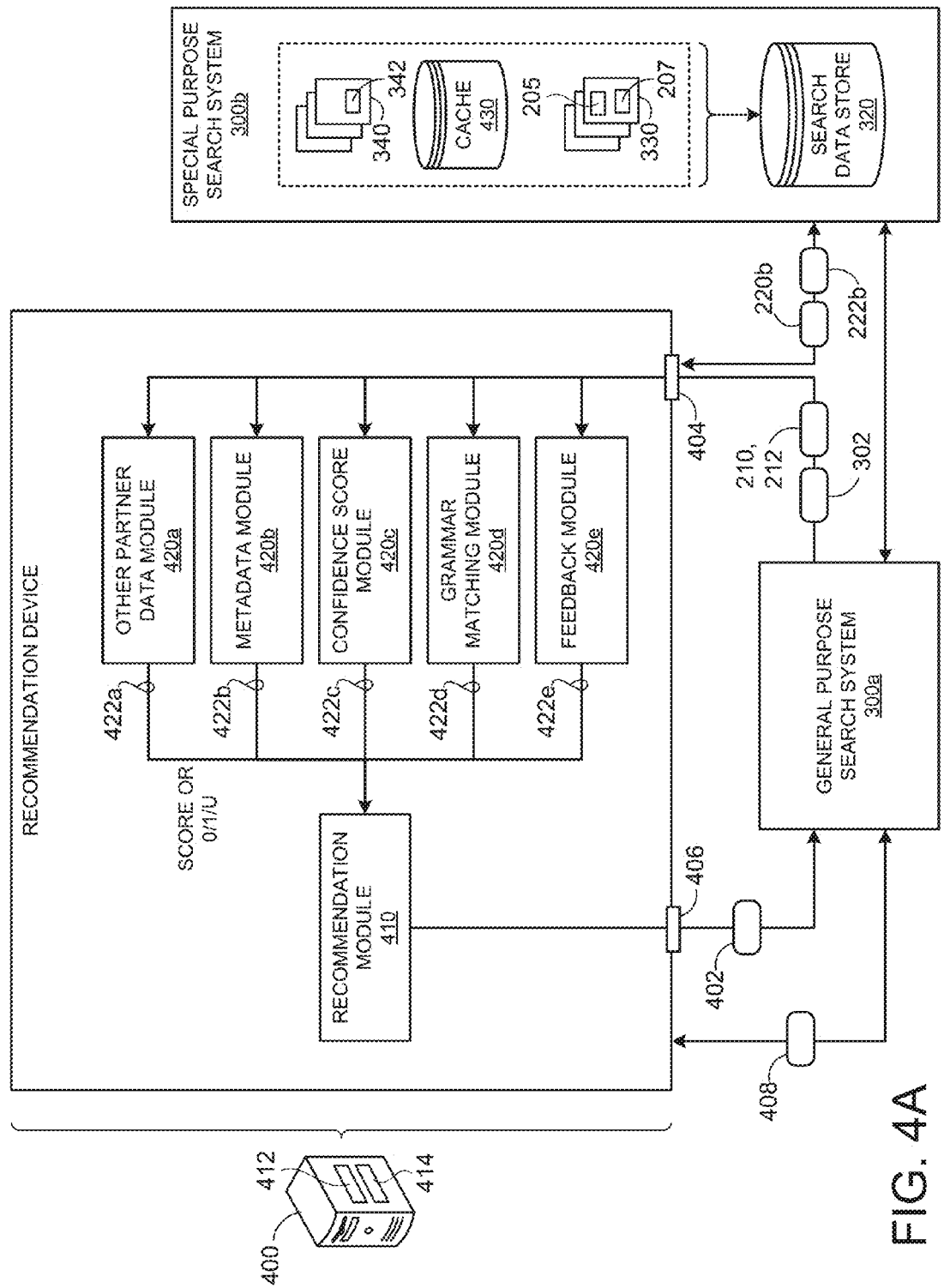
FIG. 4A is a schematic view of an example recommendation device.

Referring to FIG. 4A, the recommendation module 400 may use a number of criteria to determine when a search query 212 should be recommended for an application search. For example, a search query 212 may be recommended for application search when including applications 204 in the search results 220 would likely satisfy the user 10. Satisfying the user 10 may be the result of recommending the search query 212 to the application search system 300b for reasons beyond determining that the search query 212 makes sense as an application search query. For example, it may seem logical to return application search results 220b for a search query 212 containing the string "Angry Birds," but if users 10 are dissatisfied with the search results 220, 220b, then the search system 300 should refrain from including the application search results 220b in the general purpose search results 220a (e.g., the search results 220 of the search system 300). Accordingly, in some implementations, the search system 300 is different than an intent matching system that only attempts to determine the intent of a user 10 (e.g., intent to see application search results 220b). The search system 300 may instead attempt to both determine a user intent and provide search results 220 that delight the user 10. For example, if the user 10 enters a search query 212 of "play golf" on the user device 200, but was not intending to search for applications 204, yet the search system 300 returns application search results 220b (e.g., as part of the search results 220) indicating golfing applications 204, the user 10 may be satisfied with the search results 220. Users 10 may submit many search queries 212 without having an initial intent to search for applications 204, but when the search system 300 returns application search results 220b, those application search results 220b may delight the user 10. For example, a search query 212 of "learn to ski" might not elicit explicit intent to search for applications 204, but the application search system 300b could return some results that indicate skiing related applications 204, which may be met by the satisfaction of the user.

The recommendation device 400 can be a machine that a customer (e.g., a general purpose search partner) installs in a customer colocation facility. The recommendation device 400 may include an input 404 (e.g., a communication connector) that receives a search query 212 (or query wrapper 210 containing the search query 212) and immediately responds by outputting a recommendation 402 (e.g., 0 or 1) from an output 406 (e.g., a communication connector). As discussed above, when the recommendation 402 includes a binary 0 or 1, 0 indicates that the general purpose search system 300a should not query the special purpose search system 300b, and 1 indicates that the general purpose search system 300a should query the special purpose search system 300b and/or that the special purpose 300b search system believes that it has a search result that is relevant to the user of the general purpose search system 300a.

Referring also to FIG. 1B, the recommendation device 400 may determine the recommendation based on one or more controllable parameters, such as a threshold value, or parameters that enable/disable "hint" modules. Different customers may control the parameters differently so that a first general purpose search system 300a-a receives a different recommendation 402 from a first recommendation device 400a than a second general purpose search system 300a-b from a second recommendation device 400b, due to the parameter settings, for the exact same search query 212. Moreover, different recommendations 402 among recommendation devices 400 may arise from different learning across the different partners. Each recommendation device 400 can be individually tuned, via the parameters, for each associated general purpose search system 300a and each recommendation device 400 may learn from the outputs of other recommendation devices 400.

The recommendation devices 400 may receive updates 408 (e.g., information, parameter settings, instructions, etc.) from the special purpose search system 300b. For example, every threshold period of time (e.g., 30 minutes, one hour, 24 hours, etc.) the recommendation device 400 may receive an update 408 of the other partner logs and/or application metadata. In some examples, the special purpose search system 300b pushes updates 408 to each recommendation device 400. The recommendation device 400 may also output updates 408 (e.g., data, statistics, a history of received search queries 212 and corresponding recommendations 402 (e.g., yes/no) in response to those search queries 212, and optionally other related information).

The recommendation device 400 can generate the recommendation 402 on its own. For example, the recommendation device 400 may not need to acquire any real-time data to make the determination. The general purpose search system 300a may analyze a search query 212 to determine what type of searches to execute (e.g., whether it is a business query, encyclopedia query, or other type of query). The recommendation device 400 may determine that it makes sense to return special purpose search results 220b (e.g., application search results) and output a recommendation 402 accordingly. In response to the positive recommendation 402, the general purpose search system 300a may generate a search engine result page (SERP) for the general purpose search results 220a, which is ready for insertion to the special purpose search results 220b. Next, the general purpose search system 300a may send the search query 212 to the special purpose search system 300b (e.g., application search system), which processes the search query 212 and returns the special purpose search results 220b for rendering with the general purpose search results 220a (collectively, search results 220).

Referring again to FIG. 4A, in some implementations, the recommendation device 400 includes a recommendation module 410 (e.g., a rules engine) that generates the recommendation 402 indicating whether to send the search query 212 to the special purpose search system 300b. The recommendation module 410 receives input from one or more additional modules 420a-e. Each of the additional modules 420a-e provides an indication (e.g., a hint) of whether the search query 212 has a special purpose intent (e.g., an application intent for an application search system) and/or would provide favorable special purpose search results 220b (e.g., that satisfy the user 10). Each of the additional modules 420a-e may output a corresponding score 422a-e (e.g., a digital value of 0/1/U) indicating whether the search query 212 has a special purpose intent (e.g., an application intent for an application search system) and/or would provide favorable special purpose search results 220b. The recommendation module 410 may follow a recommended flow chart, which may implement any set of combinations of additional module scores 422a-e (e.g., hints). The output of the recommendation module may be 0/1 (NO/YES).

If the additional modules 420a-e implement a digital output of 0/1/U, a "1" may tend to indicate that sending the search query 212 to the special purpose search system 300b is recommended. A "0" may tend to indicate that sending the search query 212 to the special purpose search system 300b may not be recommended. A "U" may be an unknown output, which may indicate that the output from other modules 420a-e should be used to make a decision. Each of the modules 420a-e may internally generate a module score 422a-e that is compared to one or more thresholds to generate the 0/1/U values. A "0" may be generated if the score is less than a lower threshold value. A "1" may be generated if a score is greater than an upper threshold value. A "U" may be generated if the score is between lower and upper threshold values. If the modules output a decimal score (e.g., 0-1), a larger score may tend to indicate that sending the search query 212 to the special purpose search system 300b is recommended.

The recommendation module 410 may consider one module score 422a-e more over another module score 422a-e. In some examples, certain module scores 422a-e are weighted to count more than other module scores 422a-e when making the recommendation 402. For example, the other partner data module 420a may be weighted more than the other modules 420a-e, because the other partner data module 420a provides insight into how search queries 212 are being handled by other partners, the type of search results 220 being produced for that search query 212 by other partners, and/or user data related to the search query 212 and/or associated search results 220 by other partners.

In the context of an application search system 300b, the modules 420a-e may include features that determine special purpose search intent (e.g., app search intent) based on at least one of: 1) other search partner data (other partner data module 420a); 2) special purpose search metadata (metadata module 420b); 3) a search confidence score (confidence score module 420c); 4) domain specific grammar matches (grammar matching module 420d); and 5) existing partner response feedback (feedback module 420e). Each of the different modules 420a-e may provide different hints as to whether there is app intent and whether the app search results 220b will be good.

The other partner data module 420a makes decisions based on data/info/user behavior/analytics data 302 acquired from other sources, such as other general purpose search systems 300a, 300a-a-300a-n (e.g., partners) or other special purposes search systems 300b, 300b-a-300b-n (e.g., app specific search engine with app specific intent). The other partner data module 420a leverages the known specific intent for app search and user behavior (e.g., user responses to search queries 212) across a collection of search system 300 (e.g., in the app domain). The other partner data module 420a may learn and/or know the special purpose application search and selection behavior in the special purpose domain (e.g., the app domain) and use that knowledge for recommending application searches in a general purpose search system 300a to a special purpose/application search system 300b. In some examples, the other partner data module 420a receives the historical special purpose application search and selection behavior data 302 (e.g., user responses/behavior to past search queries, such as click-through rate) from other general purpose search systems 300a, 300a-a-300a-n. User responses may include selecting (clicking) a search results 220, scrolling past the search result 220, selecting the search result 220, but backing out of the search result within a threshold period of time, etc. In a sense, other partner data may embody the notion that if users 10 entered the same search query 212 on another partner's general purpose search system 300a and the users 10 liked the special purpose/application search results 220b, then the other partner data module 420a should recommend sending the search query 212 to the special purpose/application search system 300b (e.g., to show the resulting app results 220b to the current user 10). If users 10 enter a particular search query 212 frequently and the users 10 historically did not like the special purpose/application search results 220b, then the other partner data module 420a should not recommend sending the search query 212 to the special purpose/application search system 300b. If the search query 212 is not a good app query or the special purpose/application search system 300b doesn't return good app search results 220b, then it is good to refrain from showing those app search results 220b to the user 10.

If the special purpose search system 300b has N associated general purpose search systems 300a, 300a-a-300a-n (e.g., partners), then the $n^{th}$ recommendation device 400n may use data from the unassociated N−1 general purpose search systems 300a, 300a-a-300a-m to make its recommendation 402. For example, the data of the general purpose search systems 300a, 300a-a-300a-n and/or the special purpose search system 300b may include user logs or histories of search queries 212 that were deemed good (e.g., produces highly relevant search results 220 and/or users 10 select the search results 220) and of search queries 212 that were deemed poor (e.g., produces poorly relevant search results 220 and/or users 10 does not select the search results 220). The other partner data module 420a may output a score 422a indicating whether the search query 212 is "a good special purpose query," "a bad special purpose query" or "Unknown" (e.g., 0/1/U, respectively). When the other partner data module 420a cannot obtain any or enough data to determine recommending or not recommending the search query 212 for the special purpose search system 300b may be an "Unknown" scenario. In some examples, the score 422a can be a score from 0-1 (e.g., a decimal value), which provides a scale versus a step function result.

In some instances, the other partner data module 420a may not be able to attribute sufficient confidence to the other partner data received from the other N−1 general purpose search systems 300a, 300a-a-300a-m. For example, there might not be enough user selection or CTR data (e.g., the query was asked twice and the user clicked once and didn't click the other time), or maybe the search query 212 was never processed before. Other modules 420b-e (e.g., hints) can be used to help determine the recommendation 402, as described hereinafter. In some examples, a search query 212 may be appropriate for a special purpose search, but the special purpose search system 300b doesn't have an answer. For example, in the context of application search, a user 10 may search for a console game to see if that game is also available through an application 204 for the user device 200, but that game, in actuality, is not available through a mobile application 204. This is a case where a search query 212 is a good app search query, but the special purpose/application search system 300b does not have an answer, because no such applications 204 exist. As a result, the other partner data module 420a may not merely assess a search query 212 based on a special purpose intent (e.g., an app specific partner), but also based on user behavioral responses to such search queries 212. The other partner data module 420a may filter the other partner historical data for past search queries 212 having good/bad responses with high confidence. If a search query 212 has a good result (e.g., a lot of clicks on a high ranking result), then it is a good query 212.

The metadata module 420b may use data pertaining to special purpose search results 220b (e.g., app search results), which the special purpose search system 300b may provide to the metadata module 420b, to determine a metadata module score 422b. In the context of app search, the metadata module 420b may use metadata 205 associated with applications 204. Application metadata 222b may include a name of an application 204, one or more of synonyms for an application name, a name of an application developer, or other information related to searches for applications 204. Each application 204 (e.g., by identifier, name, etc.) may have an associated application-metadata score 207 (e.g., 0-1), indicating a popularity (e.g., number of downloads, review count, etc.) of the application 204. The application-metadata score 207 may be relatively greater for more popular applications 204 and lesser for less popular applications 204. Non-transitory memory, such as the search data store 320 of the special purpose search system 300b may store the application-metadata scores 207 (e.g., in the corresponding function records 330, such as in the application state information 334).

The metadata module 420b may first determine whether the search query 212 matches a name or synonym of an application 204 or an application developer 130a. If so, the metadata module 420b may obtain a corresponding application-metadata score 207 of the application 204 having the matching name or synonym. The metadata module 420b may collect an application-metadata score 207 for every application 204 having a matching name or synonym and determine a metadata module score 422b based on the application-metadata scores 207. In some examples, a search query 212 may match a name of an application 204, but this does not necessarily mean the application 204 is a good result. For example, if the application 204 is not very popular, the average rating of the application 204 is very low or users 10 rarely or never select the application 204 (i.e., has a low application-metadata score 207), then the application 204 is not a good result. In some examples, the metadata module 420b outputs a metadata module score 422b as an integer of 0 or 1, indicating bad or good, or a decimal (e.g., 0-1) indicating a level of goodness based on the application-metadata score(s) 207. The metadata module 420b may output a 1 if the application-metadata score 207 (or average of the application-metadata scores 207) is greater than a threshold metadata score, and output a 0 if the application-metadata score 207 (or average of the application-metadata scores 205) is less than the threshold metadata score.

In some implementations, the metadata module 420b includes an application name normalizer and a query app name normalizer as an enhancement before comparing names to detect matches. For example, the metadata module 420b may normalize the app names and the search queries 212 before checking for matches (e.g., exact matches) between them. A rule-based normalizer is an example normalizer. The normalizer may also drop certain words, e.g. the application title "Space Wars HD Free Edition" could be normalized to "space wars," the query "space wars free" could also be normalized to "space wars" for the metadata module, etc.

The search confidence module 420c may output a search confidence score 422c for a received search query 212. The search confidence score 422c can be a number based on a relevance of the special purpose search results 220b, the popularity of the special purpose search results 220b, or other factors associated with the search query 212. The search confidence module 420c may generate the search confidence score 422c as a result of a search executed on the special purpose search system 300b. Since the recommendation device 400 may need to operate quickly, executing extra searches on the special purpose search system 300b can be avoided by maintaining a search confidence cache 430 for matching search queries 212 with search confidence scores 422c. By using such a cache 430, the recommendation device 400 can make a recommendation 402 quickly and without communicating with other servers or services. In some examples, the special purpose search system 300b maintains the search confidence cache 430 (e.g., the data store 320) and generates the search confidence cache 430 during downtime and can be updated when the special purpose search system 300b changes its searching behavior. In some instances, the recommendation module 400 uses the search confidence scores 422c for recently executed search queries 212 (e.g., cached search queries 212).

In some examples, the search confidence module 420c outputs a search confidence scores 422c as an integer of 0 or 1, indicating bad or good, or a decimal (e.g., 0-1) indicating level of goodness. The search confidence module 420c may output a 1 if the search confidence scores 422c is greater than a threshold confidence score, and output a 0 if the search confidence scores 422c is less than the threshold confidence score. If a search confidence scores 422c is low (e.g., less than the threshold score), the recommendation device may not want to send the search query 212 to the special purpose search system 300b, because the special purpose search results 220b may have little value to the user 10. The partner that operates the general purpose search system 300a may set the threshold confidence score. So each of the partners can set their own threshold confidence score depending on what they think works best for their general purpose search system 300a.

In some instances, the search confidence module 420c may be unable to determine whether the user 10 actually intended to search for special purpose search results 220b (e.g., applications 204). The special purpose search system 300b may be able to return good special purpose search results 220b (e.g., application search results), but the user 10 may not have intended to seek those special purpose search results 220b. For example, in the context of application search, the special purpose/application search system 300b may be able to return good app results 220b for a search query 212 of "Abraham Lincoln", such as a game called "Abraham Lincoln Zombie Hunter," but the user 10 might want information on the former President, Abraham Lincoln, instead of a game.

The grammar matching module 420d may return a grammar score 422d based on whether the search query 212 matches one or more specific grammars 340 within a search domain of the special purpose search system. For example, application search has an app specific search domain that includes specific grammars, such as "download (app name)." For the example grammar 340 of "download (app name)," if the special purpose search system has a list of applications names (e.g., function records 330 stored in the search data store 320) and one of the names matches the (app name), then special purpose search system 300b can match the grammar 340. As another example, for "apps that (function)," if the special purpose search system 300b has a list of functions and one matches the (function), then special purpose search system 300b can match the grammar 340. As yet another example, for "(app name) for (platform)," if the special purpose search system 300b can match this grammar 340, then it is very likely that the user 10 has app intent. Each domain specific grammar 340 can have an associated grammar score 342. The grammar matching module 420d can determine if the search query 212 matches a domain specific grammar 340 and return a module score 422d based on the associated grammar score 342.

The feedback module 420e may return a feedback score 422e based on user behavioral data 302 from the general purpose search system 300a associated with the recommendation device 400. The feedback module 420e may learn user intent based on the response of users 10 to that particular general purpose search system 300a, and may therefore remedy some deficiencies of other modules 420a-d through the observation that different users 10 of different search systems 300 may behave differently.

As an example, if a general purpose search system 300a receives a search query 212 of "angry birds," the general purpose search system 300a might determine that the user 10 seeks applications 204; however, a majority of the users 10 may actually seek toys. Instead, if the users 10 wanted the application 204, they might type "angry birds app." When a user 10 does not click on the special purposes search results 220b (e.g., applications 204) or scrolls past them after being shown those search results 220b multiple times, then the feedback module 420e may learn that user behavior and return a feedback score 422e not recommending the search query 212 for the special purpose search system 300b. In some implementations, the feedback module 420e outputs a feedback score 422e as an integer of 0 or 1, indicating No or Yes, or a decimal (e.g., 0-1) indicating level of recommendation, where a 0 indicates that the general purpose search system 300a should not query the special purpose search system 300b, and 1 indicates that the general purpose search system 300a should query the special purpose search system 300b.

In some implementations, the general purpose search system 300a may also specify how and where the special purpose search results 220b will be rendered in order to help the special purpose search system 300b determine behavioral actions of the users 10 in response to the search results 220. For example, a low click-through rate (CTR) may be expected if the special purpose search results 220b are always shown on the second page of the SERP. Such data may be used to determine how much to weight the CTR or other clicking/selection metrics. Put another way, knowing how the special purpose search results 220b are presented may affect interpretation of the user interaction with the special purpose search results 220b. The special purpose search system 300b may use user interaction information with the search results 220, such as CTR and/or other metrics, for determining special purpose search system 300b and/or for updating the recommendation device(s) 400, 400a-n. For example, the general purpose search system 300a may inform the special purpose search system 300b if all, a portion, or none of the special purpose search results 220b were rendered, if the user 10 viewed the special purpose search results 220b, if the placement of the special purpose search results 220b on the SERP was bad/good (e.g., via CTR). A low CTR (e.g., 10%) on the tenth result 220b may be pretty good in some circumstance; and a moderate CTR (e.g., 20%) on the first result may be bad in other circumstances.

The recommendation module 410 considers one module score 422a-e more over another module score 422a-e. In some examples, certain module scores 422a-e are weighted to count more than other module scores 422a-e. For example, the other partner data module 420a may be weighted more than the other modules 420a-e. In some examples, the other partner data module 420a can veto other modules 420b-e.

Figure 5:
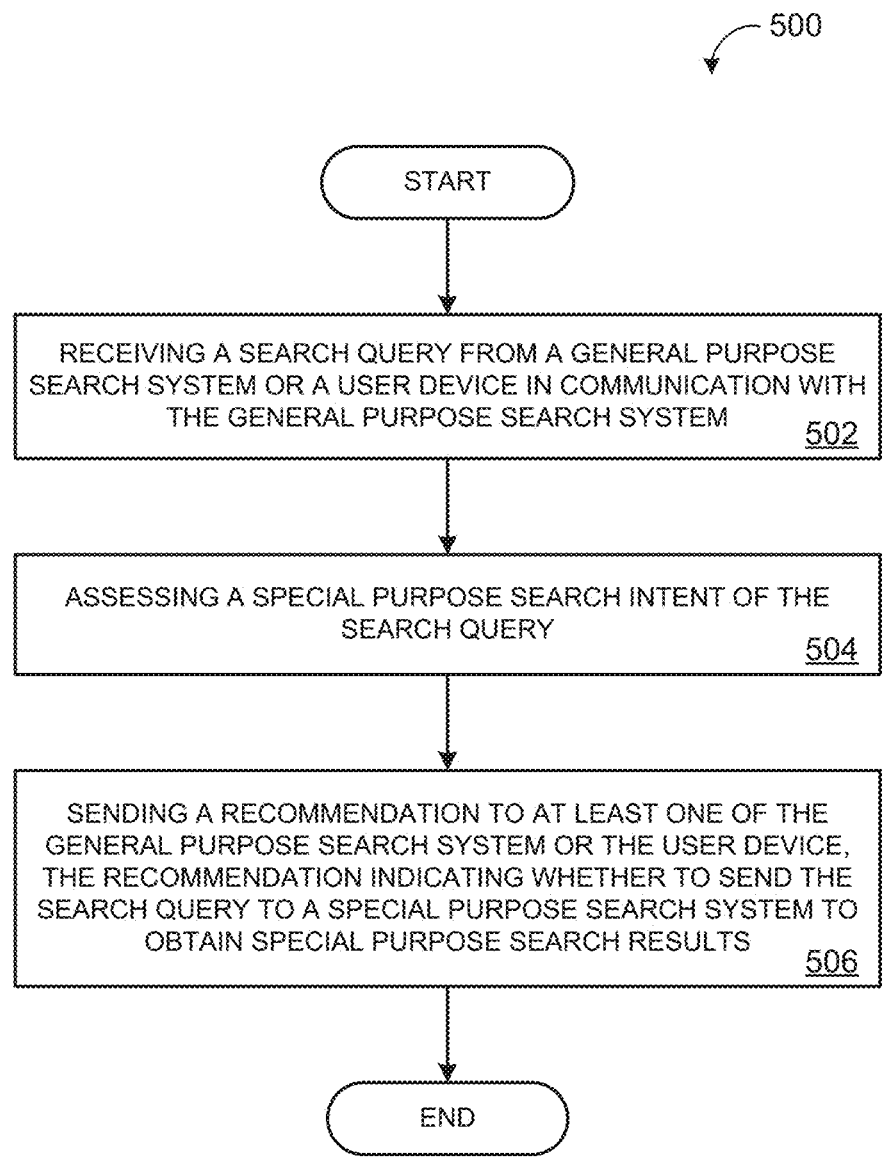
FIG. 5 is a schematic view of an example arrangement of operations for a method of recommending a search query to a special purpose search system.

FIG. 5 provides an example arrangement of operations for a method 500 of providing a recommendation 402 of whether to send a search query 212 to a special purpose search system 300b. Referring also to FIG. 4A, the recommendation device 400 includes a computing device 412 (e.g., computer processor) in communication with the general purpose search system 300a and the special purpose search system 300b and non-transitory memory 414 in communication with the computing device 412. The non-transitory memory 414 stores instructions that when executed on the computing device 412 cause the computing device 412 to perform operations of the method 500.

The method 500 includes receiving 502, at the computing device 412, a search query 212 from the general purpose search system 300a or a user device 200 in communication with the general purpose search system 300a and assessing 504, at the computing device 412, a special purpose search intent of the search query 212. The method 500 also includes sending 506 a recommendation 402 from the computing device 412 to at least one of the general purpose search system 300a or the user device 200a. The recommendation 402 indicates whether to send the search query 212 to the special purpose search system 300b to obtain special purpose search results 220b.

In some implementations, the method 500 includes receiving information related to special purpose searches 212 from the special purpose search system 300b and determining the recommendation 402 based on the received information. In some examples, the recommendation 402 includes an integer value of 0 or 1, where 0 instructs not sending the search query 212 to the special purpose search system 300b, and 1 instructs sending the search query 212 to the special purpose search system 300b. Additionally or alternatively, the recommendation 402 includes a decimal value, where the greater the value of the decimal value, the greater the recommendation to send the search query 212 to the special purpose search system 300b.

The method 500 may include receiving the search query 212 at multiple scoring modules 420a-e executing at the computing device 412. Each scoring module 420a-e assesses the search query 212 and outputs a corresponding module score 422a-e indicating whether to send the search query 212 to the special purpose search system 300b. The method 500 includes determining, at the computing device 412, the recommendation 402 based on the module scores 422a-e. In some examples, each module score 422a-e includes an indicator recommending sending the search query 212 to the special purpose search system 300b, not sending the search query 212 to the special purpose search system 300b, or no recommendation on whether to send the search query 212 to the special purpose search system 300b.

In some implementations, receiving the search query 212 at multiple scoring modules 420a-e includes receiving the search query 212 at a partner data module 420a executing at the computing device 412. The partner data module 420a assesses the search query 212 based on historical special purpose application search and selection user behavior data 302 in a special purpose search domain. The special purpose application search and selection user behavior data 302 may include user responses to past search queries 212. The method 500 may include receiving the historical special purpose application search and selection user behavior data 302 from other general purpose search systems 300a-a-300a-n.

In some implementations, receiving the search query 212 at multiple scoring modules 420a-e includes receiving the search query 212 at a metadata module 420b executing at the computing device 412. The metadata module 420b assesses the search query 212 by matching the search query 212 with metadata 205, 222b associated with special purpose search results 220b or synonyms of the metadata 205, 222b, which has an associated metadata score 207, and outputting a module score 422b based on a metadata score(s) 207 of any matched metadata 205, 222b. The metadata score 207 indicates a level of popularity of the special purpose search result 220b. In the context of application searches, the metadata 205 and corresponding metadata score(s) 207 can be associated with one or more applications 204. The method 500 may include receiving the metadata 205, 222b associated with special purpose search results 220b (e.g., applications 204) from the special purpose search system 300b. Moreover, the method 500 may include normalizing (e.g., down-casing, removing extra spaces and punctuation, etc.) the search query 212 and the metadata 205, 222b before matching the search query 212 with the metadata 205, 222b.

In some implementations, receiving the search query 212 at multiple scoring modules 420a-e includes receiving the search query 212 at a search confidence module 420c executing at the computing device 412. The search confidence module 420c assesses the search query 212 by matching the search query 212 with a previously executed search query 212 of the special purpose search system 300b and outputting a module score 422c based on a search confidence score 422c associated with the previously executed search query 212. The search confidence score 422c indicates a level of relevance or popularity of a previously executed search query 212 based on past user responses to the previously executed search query 212. The search confidence module 420c may output a favorable module score 422c recommending that the general purpose search system 300a or the user device 200 send the search query 212 to the special purpose search system 300b when the search confidence score 422c is greater than a threshold search confidence score.

In some implementations, receiving the search query 212 at multiple scoring modules 420a-e includes receiving the search query 212 at a grammar matching module 420d executing at the computing device 412. The grammar matching module 420d assesses the search query 212 by matching the search query 212 with a grammar 340 within a search domain of the special purpose search system 300b. Each grammar 340 has an associated grammar score 342. The grammar matching module 420d outputs a module score 422d based on the associated grammar score 342 of the matching grammar 340. For example, a grammar 340 of "application for [[some function]]" may have a relatively high grammar score 342, because a user 10 entering a search query 212 matching such a grammar 340 would likely have a high application search intent.

In some implementations, receiving the search query 212 at multiple scoring modules 420a-e includes receiving the search query 212 at a feedback module 420e executing at the computing device 412. The feedback module 420e assesses the search query 212 based on user response data 302 received from the general purpose search system 300a associated with the recommendation device 400. The user response data 302 indicates a level of responsiveness to special purpose search results 220b generated by the special purpose search system 300b and included in the general purpose search results 220a. The user response data 302 may include qualitative or quantitative assessment of how users 10 interact with the special purpose search results 220b, such as whether users 10 scroll past, select/click on, or click-in and click-out of certain special purpose search results 220b.

The method 500 may include weighting one or more module scores 422a-e, so that one module score 422a-e is considered more over another module score 422a-e. For example, the other partner data module 420a may be weighted more than the other modules 420a-e.

Figure 4B:
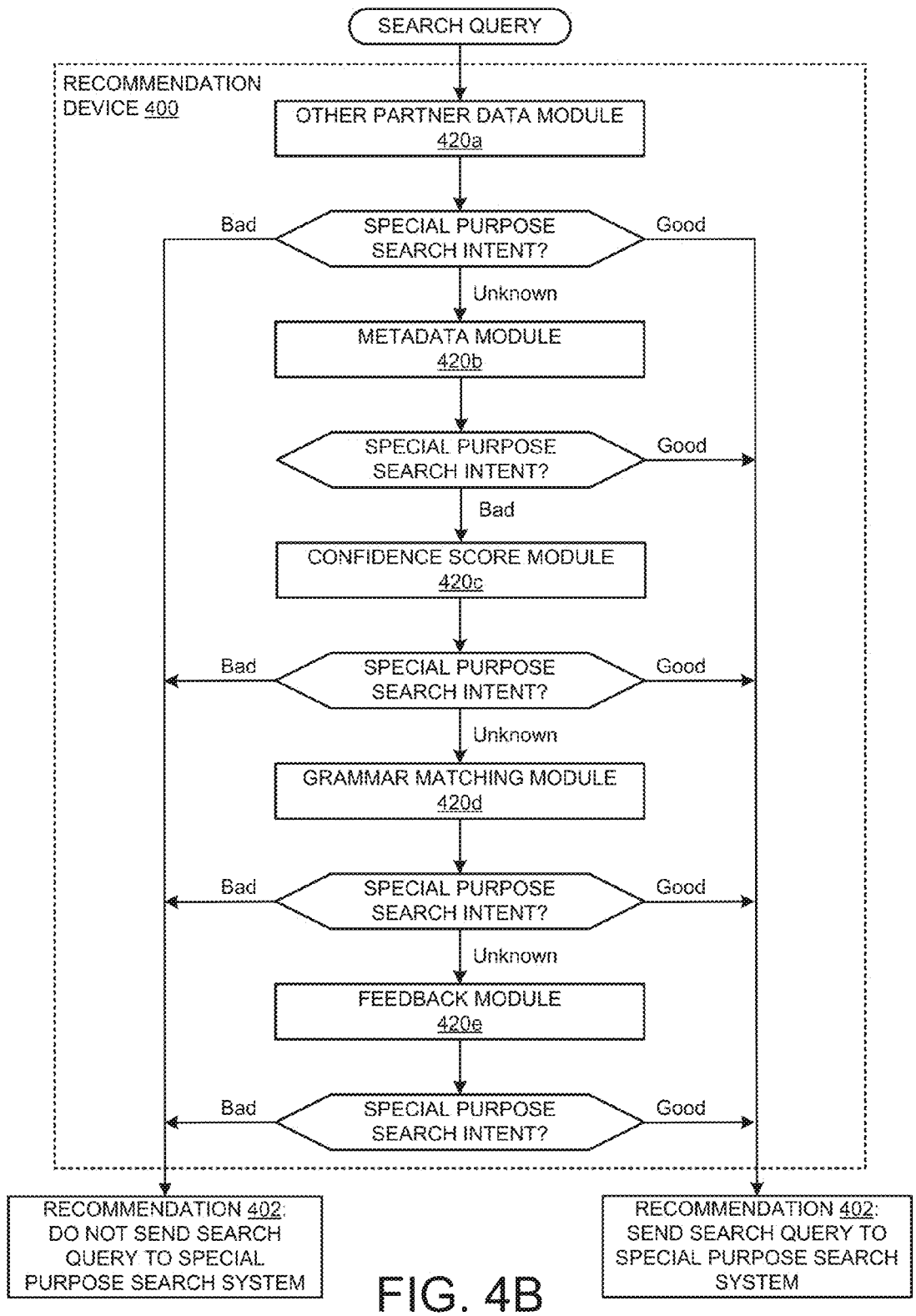
FIG. 4B is a flow diagram illustrating an example recommendation processes of a recommendation device.

Referring to FIG. 4B, in some implementations, the recommendation device 400 receives a search query 212 having an unknown special purpose search intent. The recommendation device 400 cleans/normalizes the search query 212 (e.g., down-cases, removes extra spaces and punctuation, etc.) and processes the search query 212 first using the other partner data module 420a. The other partner data module 420a returns a first module score 422a indicating whether the search query 212 has known good special purpose search intent, known bad special purpose search intent, or unknown special purpose search intent. If the search query 212 has known good special purpose search intent, the recommendation device 400 returns a recommendation 402 instructing to send the search query 212 to the special purpose search system 300b (to receive and include special purpose search results 220b in the general purpose search results 220a). If the search query 212 has known bad special purpose search intent, the recommendation device 400 returns a recommendation 402 instructing to not send the search query 212 to the special purpose search system 300b (and merely return general purpose search results 220a). If the search query 212 has unknown special purpose search intent, the metadata module 420b receives and assesses the search query 212.

The metadata module 420b analyzes the search query 212 and returns a second module score 422b indicating whether the search query 212 matches a special purpose search result 220b (e.g., matches an application name or synonym of the application name) having a popularity greater than or equal to a threshold popularity. If the second module score 422b indicates that the search query 212 matches a special purpose search result 220b having a popularity greater than or equal to a threshold popularity, the recommendation device 400 returns a recommendation 402 instructing to send the search query 212 to the special purpose search system 300b. If the second module score 422b indicates that the search query 212 matches a special purpose search result 220b having a popularity less than the threshold popularity, the search confidence module 420c receives and assesses the search query 212.

The search confidence module 420c analyzes the search query 212 and returns a third module score 422c indicating whether the search query 212 matches a previously executed search query 212 having an associated search confidence score 422c greater than or equal to a threshold search confidence score. If the third module score 422c indicates that the search query 212 matches a previous search query 212 having a search confidence score 422c greater than or equal to the threshold search confidence score, the recommendation device 400 returns a recommendation 402 instructing to send the search query 212 to the special purpose search system 300b. If the third module score 422c indicates that the search query 212 matches a previously executed search query 212 having an associated search confidence score 422c less than the threshold search confidence score, the recommendation device 400 returns a recommendation 402 instructing to not send the search query 212 to the special purpose search system 300. Finally, if the third module score 422c indicates that the search query 212 does not match any previously executed search queries 212 (e.g., does not match any cached queries 212), the grammar matching module 420d receives and assesses the search query 212.

The grammar matching module 420d analyzes the search query 212 and returns a fourth module score 422d indicating whether the search query 212 matches a grammar 340 having a grammar score 342 greater than or equal to a threshold grammar score 342. If the fourth module score 422d indicates that the search query 212 matches a grammar 340 having a grammar score 342 greater than or equal to the threshold grammar score, the recommendation device 400 returns a recommendation 402 instructing to send the search query 212 to the special purpose search system 300b. If the fourth module score 422d indicates that the search query 212 matches grammar 340 having an associated grammar score 342 less than the threshold grammar score, the recommendation device 400 returns a recommendation 402 instructing to not send the search query 212 to the special purpose search system 300b. Finally, if the fourth module score 422c indicates that the search query 212 does not match any grammars 340 (e.g., does not match any grammars 340 stored in the data store 320), the feedback module 420e receives and assesses the search query 212.

The feedback module 420e analyzes the search query 212 and returns a fifth module score 422e indicating whether the search query 212 exhibits special purpose search intent based on user behavioral data 302 received from the general purpose search system 300a associated with the recommendation device 400. If the fifth module score 422e indicates that the search query 212 exhibits special purpose search intent, the recommendation device 400 returns a recommendation 402 instructing to send the search query 212 to the special purpose search system 300b; otherwise, the recommendation device 400 returns a recommendation 402 instructing to not send the search query 212 to the special purpose search system 300.

Figure 6A:
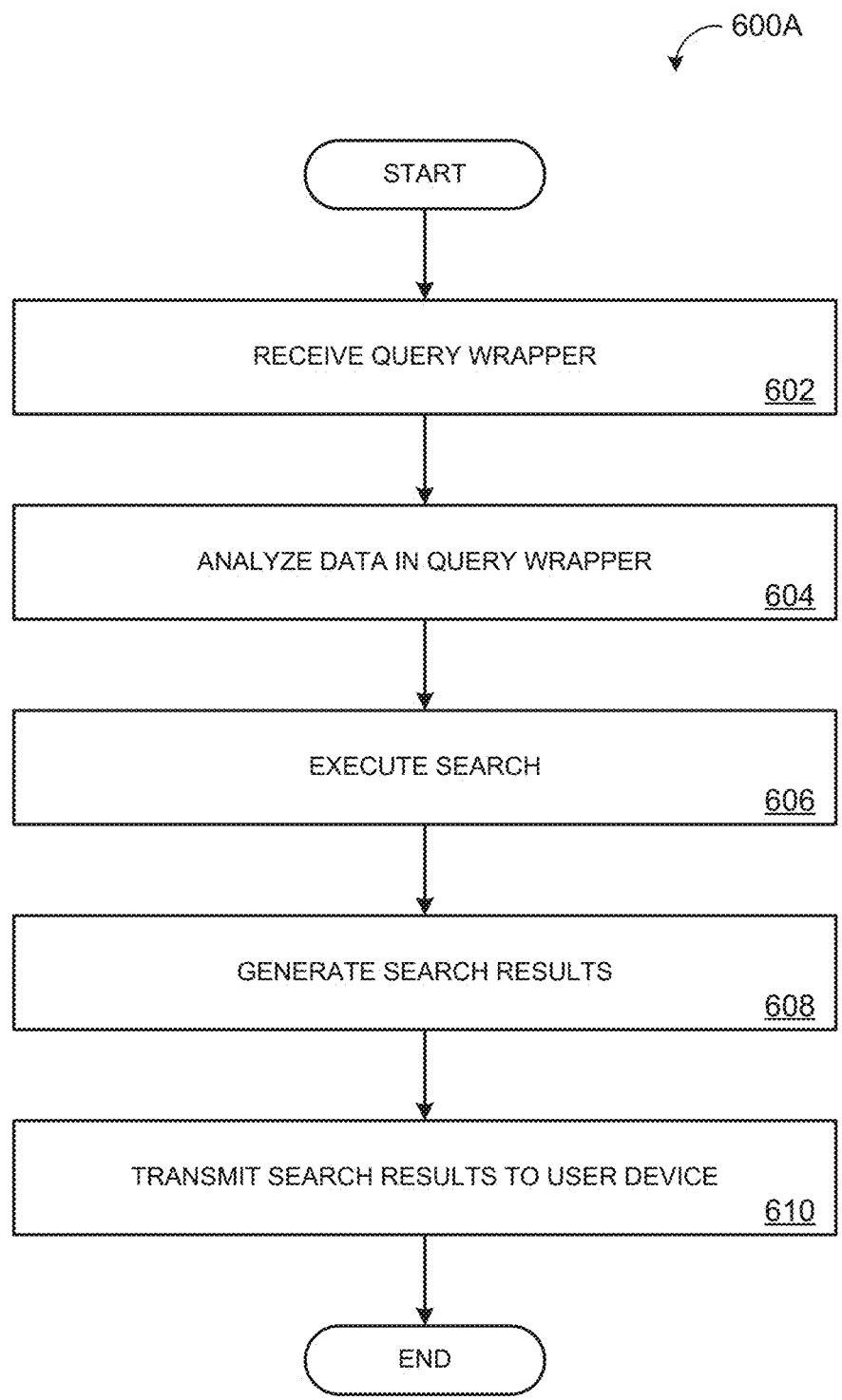
FIG. 6A is a schematic view of an example arrangement of operations for a method of performing a search on a search system.

FIG. 6A provides an example arrangement of operations for a method 600A of performing a search. The method 600A is described with respect to the user device 200, the search system 300, and the search module 310 as illustrated in FIG. 2. In block 602, the search module 310 receives the query wrapper 210. In block 604, the search module 310 analyzes data (e.g., the search query 212) included in the query wrapper 210. For example, the query analysis module 312 analyzes the search query 212 (and/or other data) of the query wrapper 210.

In some examples, the search module 310 may determine the geo-location of the user device 200 in terms of latitude and longitude values that indicate the latitude and longitude of the user device 200. Additionally, or alternatively, the search module 310 may determine the geo-location of the user device 200 in terms of an address, such as a postal address (e.g., a street address, zip code, and/or city name). The geo-location of the user device 200 determined by the search module 310 may be a point location (e.g., a latitude/longitude or a postal address). The user device 200 may generate geo-location data 218 (e.g., latitude and longitude) and the query wrapper 210 including the geo-location data 218. In some examples, the search module 310 determines the geo-location of the user device 200 based on data (e.g., an IP address 228) included in the query wrapper 210. For example, the search module 310 may look up the location of the user device 200 using the IP address 228. The search module 310 may communicate with a remote server 110 that can provide geo-location data for the user device 200 based on the IP address 228.

At block 606, the method 600A includes executing a search, for example, by identifying and selecting function records 330 based on the data of the query wrapper 210 (e.g., the search query 212). At block 608, the method 600A includes generating the search results 220. The search system 300 (e.g., in particular, the search module 310) may generate the search results 220 based on a scoring of considered function records 330. The set processing module 316 generates search results 226 including a list of the selected application access mechanisms 202 from selected function records 330.

Finally, at block 610, the method 600A includes transmitting the search results 220 to the user device 200. The search module 310 may deliver the search results 220, which can include access mechanisms 202, results scores 226, and/or link data 232. For example, the set processing module 316 transmits the search results 226 to the user device 200 that generated the search query 212.

Figure 6B:
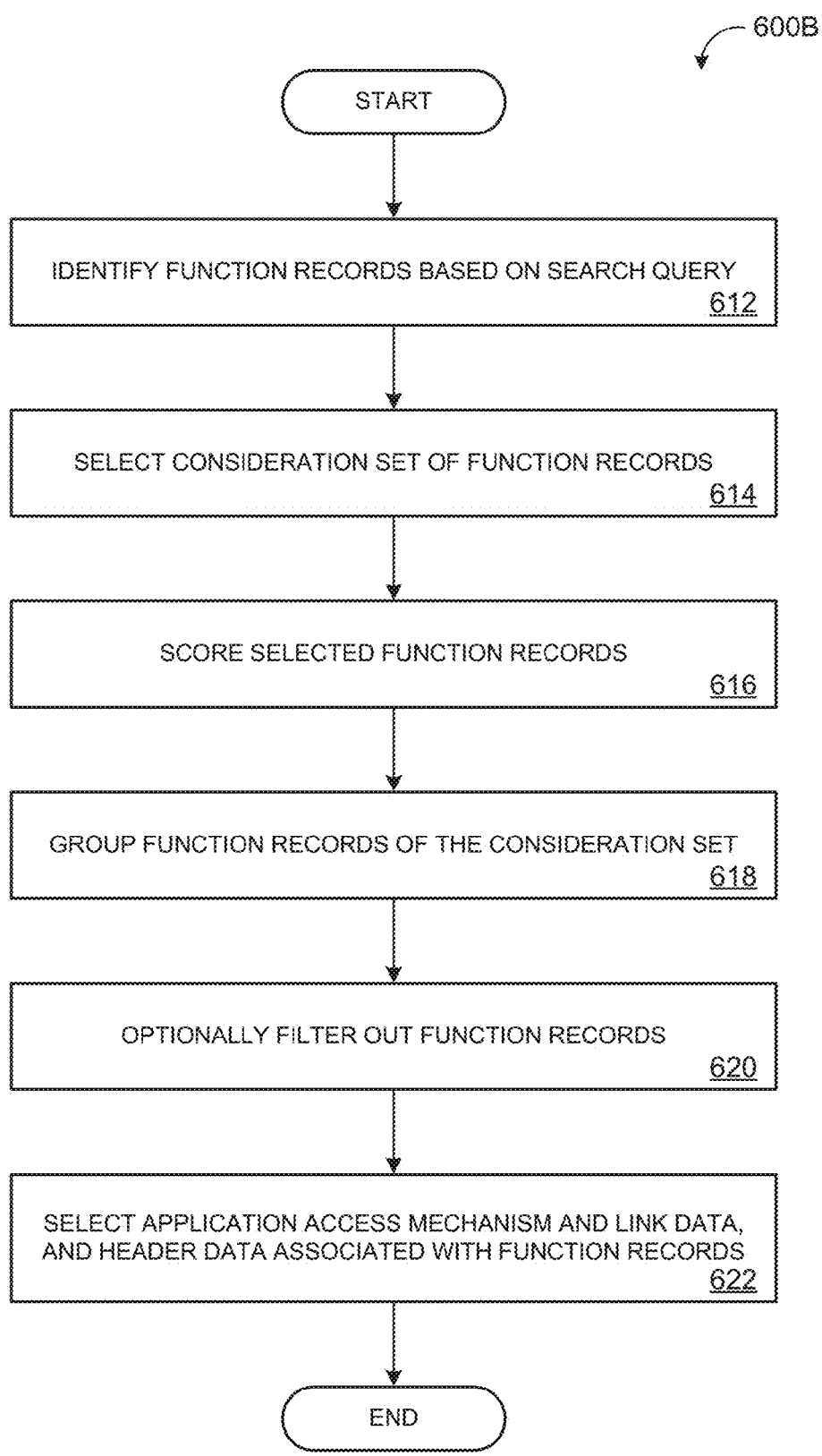
FIG. 6B is a schematic view of an example arrangement of operations for a method of generating search results.

FIG. 6B provides an example arrangement of operations for a method 600B of executing the search (e.g., at block 606). The method 600B is described with respect to the user device 200, the search module 310, and the data store 320 as illustrated in FIG. 2.

At block 612, the method 600B includes identifying function records 330 based on a search query 212. The search module 310 identifies function records 330 in the search data store 320 based on the search query 212 received in the query wrapper 210. For example, the search module 310 may identify function records 330 in the data store 320 by detecting search term matches between terms (e.g., words) of the search query 212 and terms included in the application state information 334 of the function records 330. In some examples, the set generation module 314 identifies a consideration set 350 of function records 330 based on the search query 212 (e.g., based on output from the query analysis module 312).

At block 614, the method 600B includes selecting a consideration set 350 of function records 330. The search module 310 selects a set 350 of function records 330 from those function records 330 identified at block 612. The selected set 350 of function records 330 may be referred to as a "consideration set" of function records 330 and/or function identifiers 332 of those function records 330. The search module 310 may score the consideration set 350 of function records 330 and include information from the consideration set 350 of function records 330 in the search results 220. The search module 310 may filter the consideration set 350 of function records 330 based on one or more criteria.

At block 616, the method 600B includes scoring the consideration set 350 of function records 330. For example, the search module 310 (e.g., the set processing module 316) may generate a score (e.g., a result score 226) for each of the function records 330 that indicates the relevance of the function record 330 to the search query 212. At block 618, the method 600B includes grouping function records 330 of the consideration set 350. For example, the set processing module 316 may group the function records 330 by application ID 336, access mechanism 202, application state information 334, result score 226, or some other attribute associated with the function record 330. By grouping the function records 330 by application ID 336, the search application 216 can display the search results 220 in an organized or ordered fashion.

At block 620, the method 600B includes optionally filtering function records 330 of the consideration set 350. In some implementations, the set processing module 316 filters the function records 330 based on one or more criteria. The criteria may be based on characteristics of the function records 330 and/or characteristics associated with the user 10. Moreover, the set processing module 316 may impose a policy that limits or reduces the number of function records 330 in the consideration set 350 and/or the result set 220. For example, the set processing module 316 may filter the function records 330 based on application ID 336 and impose a policy that limits or reduces the number of function records 330 to a maximum number of function records 330 per each application ID 332.

At block 622, the method 600B includes selecting one or more access mechanisms 202, link data 232, and header data 242 associated with function records 330 in the consideration set 350 for transmission in the search results 220. In some examples, the header 242 is a name or nickname of an application 204 having a grouping of function records 330 in the search results 220. The search module 310 may select access mechanisms 202 from the function records 330 associated with the largest result scores 226 determined at block 616. In some implementations, the search module 310 determines which access mechanisms 202 are compatible with the user device 200 based on the platform data 222. In these implementations, the search module 310 may transmit a subset of the access mechanisms 202 from the selected function records 330 which are compatible with the user device 200 (e.g., based on OS version, web browser version, and/or device type). The set processing module 316 may select function records 330 from the consideration set 350 based on the result scores 226 associated with the function records 330 and select access mechanisms 202 from the selected function records 330. For example, the set processing module 316 may select function records 330 having the highest result scores 226 and then select access mechanisms 202 from those function records 330.

Figure 7:
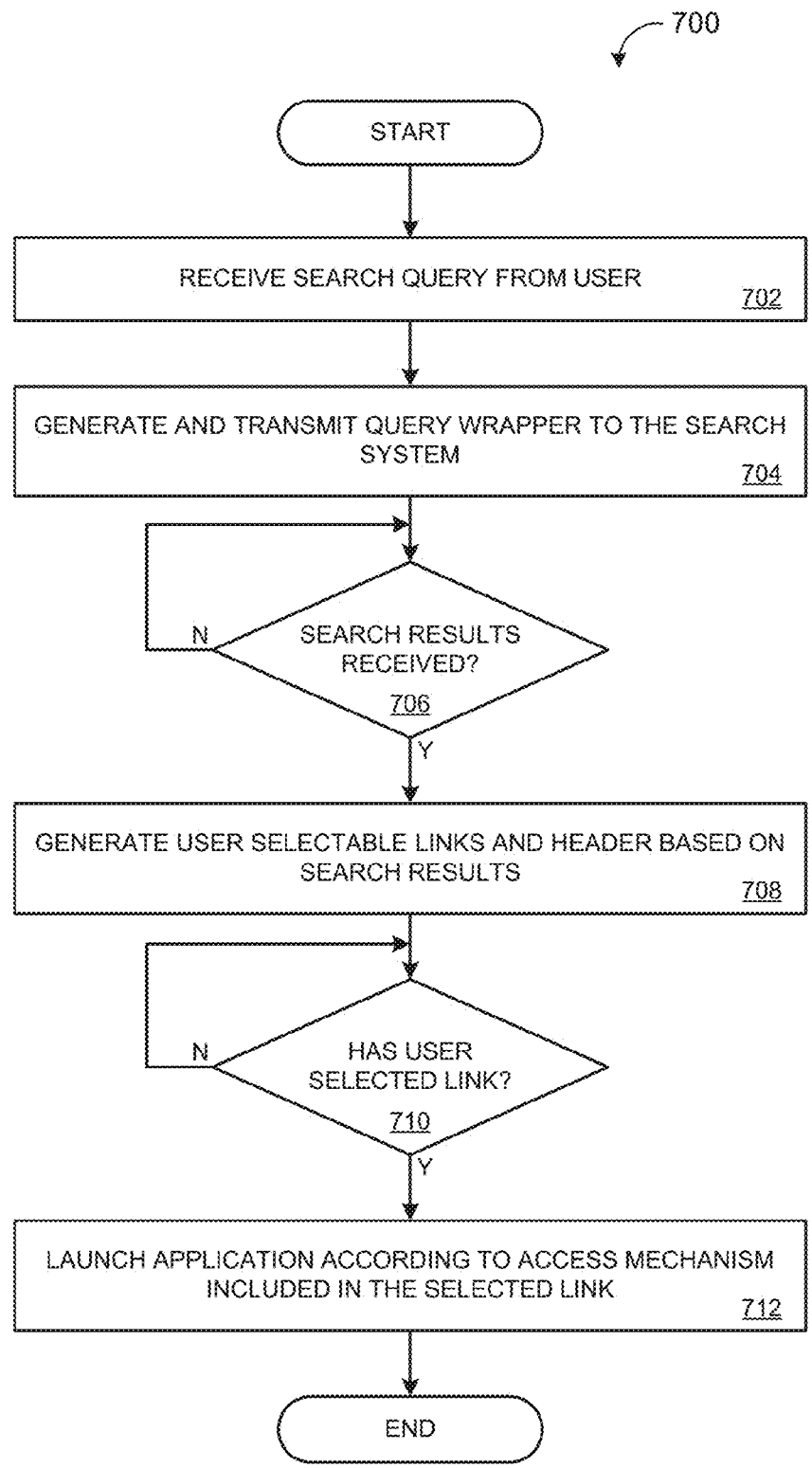
FIG. 7 is a flow diagram illustrating an example method of operating a user device.

FIG. 7 provides an example arrangement of operations for a method 700 of operating a user device 200. It may be assumed that the user device 200 described according to the method 700 includes a search application 216 (e.g., a native application 204a or web-browser application 204b) configured to communicate with the search system 300.

At block 702, the method 700 includes receiving a search query 212 from a user 10. In some implementations, the search application 216 executing on the user device 200 receives the search query 212 from of the user 10. At block 704, the method includes generating and transmitting query wrapper 210 to the search system 300. In some implementations, the user device 200 generates and transmits the query wrapper 210 to the search system 300. At block 706, the method 700 includes waiting for receipt of the search results 220. For example, the user device 200 waits for receipt of the search results 220 from the search system 300. The search results 220 may include a list of access mechanisms 202 and optionally result scores 226 associated with the access mechanisms 202. Additionally, the search results 220 may optionally include link data 230 (e.g., text and/or images) for the access mechanisms 202. The search application 216 may generate user selectable links 230 in the GUI 240 based on the received link data 230. At block 708, the method 700 includes generating user selectable links 230 and a header 242 (e.g., for a group of links 230) based on the search results 220. The search application 216 may generate the user selectable links 230 and the header 242 or receive them from the search module 310.

At block 710, the method 700 includes waiting for a user selection of a link 230, 244. For example, the search application 216 may wait for the user 10 to select one of the user selectable links 230 or a header link 244 before operation proceeds to a subsequent block 712. When the user 10 selects (e.g., touches) one of the user selectable links 230, the method 700 includes launching an application 204 associated with the link 230. For example, in response to selection of a link 230 including an access mechanism 202, the user device 200 launches the application 204 referenced in the access mechanism 202 and performs one or more operations indicated in the access mechanism 202 in block 712.

Modules and data stores included in the search system 300 represent features that may be included in the search system 300 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the search system 300 may be a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the search system 300 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the search system 300 may be configured to communicate with the network 120. The one or more computing devices of the search system 300 may also be configured to communicate with one another (e.g., via a computer network). In some examples, the one or more computing devices of the search system 300 may include one or more server computing devices configured to communicate with user devices (e.g., receive query wrappers and transmit search results), gather data from data sources 130, index data, store the data, and store other documents. The one or more computing devices may reside within a single machine at a single geographic location in some examples. In other examples, the one or more computing devices may reside within multiple machines at a single geographic location. In still other examples, the one or more computing devices of the search system 300 may be distributed across a number of geographic locations.

Figure 8:
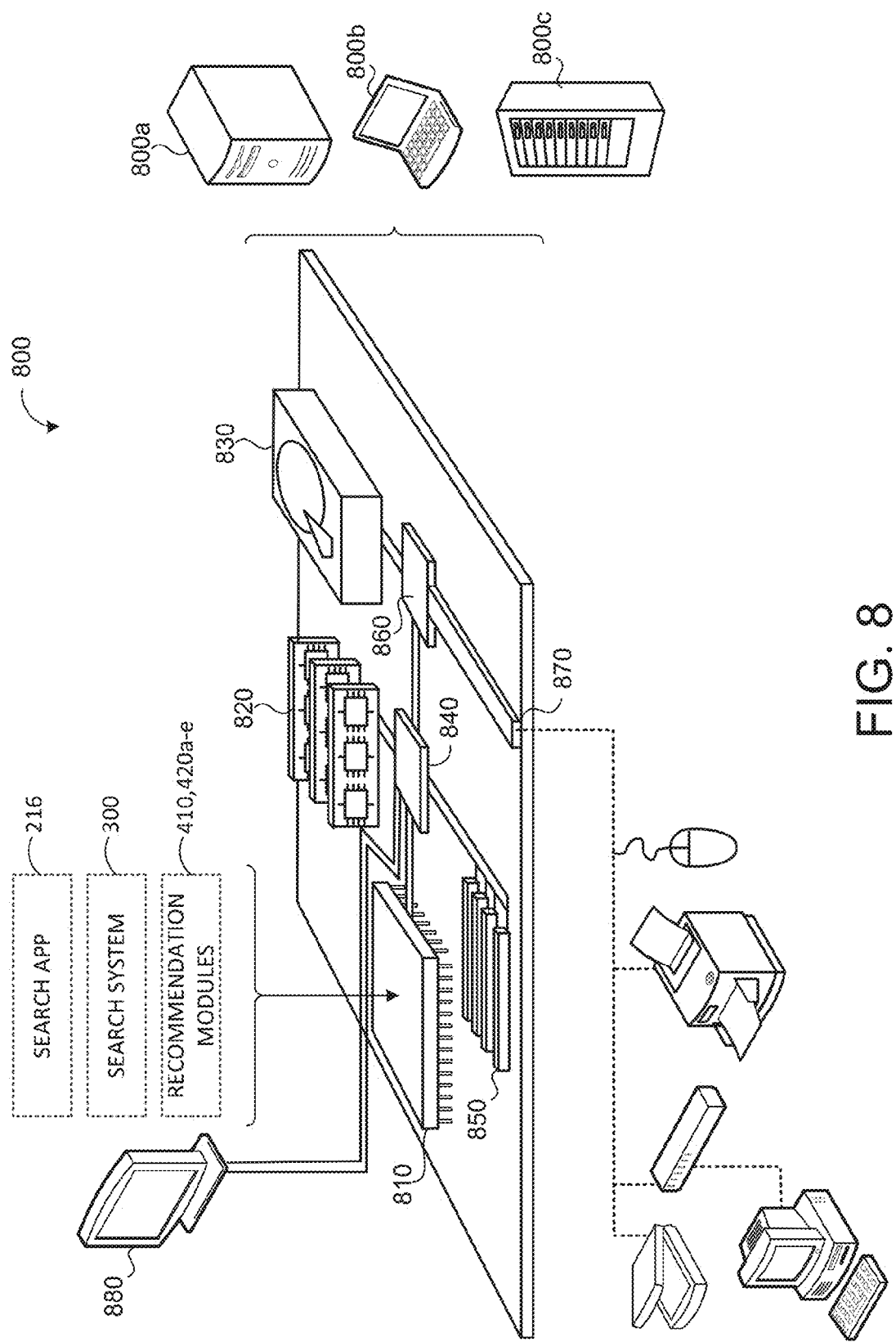
FIG. 8 is a schematic view of an example computing device executing any systems or methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to low speed bus 870 and storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:

receiving, at a computing device, a search query originating from a general purpose search system or a user device in communication with the general purpose search system;

in response to receiving the search query, determining, at the computing device, a first module score, wherein the first module score is based on at least one input received by the user device in response to a previous search query;

in response to determining that the first module score is greater than a first minimum threshold score and less than a first maximum threshold score, determining, at the computing device, a second module score, wherein:
  the second module score is based on a match between (i) the search query and (ii) each application of a first set of applications associated with a special purpose search system; and
  each application of the first set of applications has a popularity score greater than or equal to a threshold popularity score;

in response to determining that the second module score is less than a second threshold score, determining, at the computing device, a third module score, wherein:
  the third module score is based on a match between (i) the search query and (ii) previously executed search queries; and
  the previously executed search queries are associated with an application search;

in response to one of (i) the first module score being greater than or equal to the first maximum threshold score, (ii) the second module score being greater than or equal to the second threshold score, and (iii) the third module score being greater than or equal to a third maximum threshold score, determining, at the computing device, that a special purpose search intent of the search query exists;

in response to determining that the special purpose search intent of the search query exists, sending a positive recommendation from the computing device to at least one of the general purpose search system, the special purpose search system, or the user device, wherein the positive recommendation includes an instruction to obtain application search results from the special purpose search system;

in response to the general purpose search system receiving the positive recommendation, generating, using the special purpose search system, application search results based on the search query;

in response to the special purpose search system generating application search results, obtaining, using the general purpose search system, the application search results from the special purpose search system;

generating, using the general purpose search system, general purpose search results based on the search query; and transmitting, using the general purpose search system, a set of the application search results and a set of the general purpose search results to the user device.

2. The method of claim 1, further comprising:

in response to one of (i) the first module score being less than the first minimum threshold score, and (ii) the third module score being less than a third minimum threshold score, sending a negative recommendation from the computing device to the general purpose search system, wherein the negative recommendation includes an instruction to not obtain application search results from the special purpose search system.

3. The method of claim 2, wherein:

the negative recommendation comprises an integer value of zero; and the positive recommendation comprises an integer value of one.

4. The method of claim 2, wherein:

the positive recommendation comprises a first decimal value;

the negative recommendation comprises a second decimal value; and the first decimal value is greater than the second decimal value.

5. The method of claim 1, wherein:

the first module score, the second module score, and the third module score each include an indicator; and the indicator corresponds to one of: (i) recommending to send the search query to the special purpose search system, (ii) recommending not to send the search query to the special purpose search system, or (iii) no recommendation on whether to send the search query to the special purpose search system.

6. The method of claim 1, wherein:

the first module score is determined by a partner data module executing at the computing device, and the partner data module determines the first module score based on a historical special purpose application search and selection user behavior data in a special purpose search domain.

7. The method of claim 6, further comprising receiving the historical special purpose application search and selection user behavior data from other general purpose search systems.

8. The method of claim 1, wherein:

the second module score is determined by a metadata module executing at the computing device, the metadata module determines the second module score by matching the search query with metadata associated with application search results or synonyms of the metadata, and the metadata includes an associated metadata score.

9. The method of claim 8, further comprising receiving the metadata associated with application search results from the special purpose search system.

10. The method of claim 8, further comprising normalizing the search query and the metadata before matching the search query with the metadata.

11. The method of claim 1, wherein the third module score is determined by:

matching the search query with a previously executed search query of the special purpose search system; and outputting a module score based on a search confidence score associated with the previously executed search query, wherein the search confidence score indicates a level of relevance or popularity of the previously executed search query based on past user responses to the previously executed search query.

12. The method of claim 11, wherein the third module score is favorable to sending the search query to the special purpose search system in response to the search confidence score being greater than a threshold search confidence score.

13. The method of claim 1, further comprising:

in response to determining that the third module score is greater than a third minimum threshold score and less than the third maximum threshold score, determining, at the computing device, a fourth module score by:

matching the search query with a grammar within a search domain of the special purpose search system, wherein each grammar has an associated grammar score; and outputting the fourth module score based on the associated grammar score; and in response to the fourth module score being greater than a fourth maximum threshold, determining, at the computing device, that the special purpose search intent of the search query exists.

14. A recommendation device comprising:

a computing device in communication with a general purpose search system and a special purpose search system; and non-transitory memory in communication with the computing device, the non-transitory memory storing instructions that when executed on the computing device cause the computing device to perform operations comprising:

receiving a search query originating from the general purpose search system or a user device in communication with the general purpose search system;

in response to receiving the search query, determining, at the computing device, a first module score, wherein the first module score is based on at least one input received by the user device in response to a previous search query;

in response to determining that the first module score is greater than a first minimum threshold score and less than a first maximum threshold score, determining, at the computing device, a second module score, wherein:

the second module score is based on a match between (i) the search query and (ii) each application of a first set of applications associated with a special purpose search system; and each application of the first set of applications has a popularity score greater than or equal to a threshold popularity score;

in response to determining that the second module score is less than a second threshold score, determining, at the computing device, a third module score, wherein:
the third module score is based on a match between (i) the search query and (ii) previously executed search queries; and
the previously executed search queries are associated with an application search;
in response to one of (i) the first module score being greater than or equal to the first maximum threshold score, (ii) the second module score being greater than or equal to the second threshold score, and (iii) the third module score being greater than or equal to a third maximum threshold score, determining, that a special purpose search intent of the search query exists;
in response to determining that the special purpose search intent of the search query exists, sending a positive recommendation from the computing device to at least one of the general purpose search system, the special purpose search system, or the user device, wherein the positive recommendation includes an instruction to obtain application search results from the special purpose search system;
in response to the general purpose search system receiving the positive recommendation, generating, using the special purpose search system, application search results based on the search query;
in response to the special purpose search system generating application search results, obtaining, using the general purpose search system, the application search results from the special purpose search system;
generating, using the general purpose search system, general purpose search results based on the search query; and
transmitting, using the general purpose search system, a set of the application search results and a set of the general purpose search results to the user device.

15. The recommendation device of claim 14, wherein the operations further comprise:
in response to one of (i) the first module score being less than the first minimum threshold score, and (ii) the third module score being less than a third minimum threshold score, sending a negative recommendation to the general purpose search system, wherein the negative recommendation includes an instruction to not obtain application search results from the special purpose search system.

16. The recommendation device of claim 15, wherein:
the negative recommendation comprises an integer value of zero; and
the positive recommendation comprises an integer value of one.

17. The recommendation device of claim 15, wherein:
the positive recommendation comprises a first decimal value;
the negative recommendation comprises a second decimal value; and
the first decimal value is greater than the second decimal value.

18. The recommendation device of claim 14, wherein:
the first module score, the second module score, and the third module score each include an indicator; and
the indicator corresponds to one of: (i) recommending to send the search query to the special purpose search system, (ii) recommending not to send the search query to the special purpose search system, or (iii) no recommendation on whether to send the search query to the special purpose search system.

19. The recommendation device of claim 14, wherein:
the first module score is determined by a partner data module executing at the computing device, and
the partner data module is configured to determine the first module score based on a historical special purpose application search and selection user behavior data in a special purpose search domain.

20. The recommendation device of claim 19, wherein the operations further comprise receiving the historical special purpose application search and selection user behavior data from other general purpose search systems.

21. The recommendation device of claim 14, wherein:
the second module score is determined by a metadata module executing at the computing device,
the metadata module is configured to determine the second module score by matching the search query with metadata associated with application search results or synonyms of the metadata, and
the metadata includes an associated metadata score.

22. The recommendation device of claim 21, wherein the operations further comprise receiving the metadata associated with application search results from the special purpose search system.

23. The recommendation device of claim 21, wherein the operations further comprise normalizing the search query and the metadata before matching the search query with the metadata.

24. The recommendation device of claim 14, wherein:
the third module score is determined by a search confidence module executing at the computing device;
the search confidence module is configured to determine the third module score by
matching the search query with a previously executed search query of the special purpose search system; and
outputting a module score based on a search confidence score associated with the previously executed search query,
wherein the search confidence score indicates a level of relevance or popularity of the previously executed search query based on past user responses to the previously executed search query.

25. The recommendation device of claim 24, wherein the search confidence module is configured to output the third module score favoring recommending sending the search query to the special purpose search system in response to the search confidence score being greater than a threshold search confidence score.

26. The recommendation device of claim 14, wherein the recommendation device is configured to:
in response to determining that the third module score is greater than a third minimum threshold score and less than the third maximum threshold score, determine a fourth module score by:
matching the search query with a grammar within a search domain of the special purpose search system, wherein each grammar has an associated grammar score; and
outputting the fourth module score based on the associated grammar score of the grammar matching module; and in response to the fourth module score being greater than a fourth maximum threshold, determine that the special purpose search intent of the search query exists.

27. A search system comprising:
a remote general purpose search system including one or more processors that are configured to execute instructions stored in a non-transitory computer-readable medium;
a special purpose search system in communication with the remote general purpose search system, wherein the special purpose search system includes one or more processors that are configured to execute instructions stored in a non-transitory computer-readable medium; and
a recommendation device in communication with the remote general purpose search system and the special purpose search system,
wherein:
the recommendation device includes one or more processors that are configured to execute instructions stored in a nontransitory computer-readable medium; and
the recommendation device is configured to, in response to receiving a search query originating from the remote general purpose search system or a user device in communication with the remote general purpose search system, determine a first module score;
the first module score is based on at least one input received by the user device in response to a previous search query;
the recommendation device is configured to, in response to determining that the first module score is greater than a first minimum threshold score and less than a first maximum threshold score, determine a second module score;
the second module score is based on a match between (i) the search query and (ii) each application of a first set of applications associated with a special purpose search system;
each application of the first set of applications has a popularity score greater than or equal to a threshold popularity score;
the recommendation device is configured to, in response to determining that the second module score is less than a second threshold score, determine a third module score;
the third module score is based on a match between (i) the search query and (ii) previously executed search queries;
the previously executed search queries are associated with an application search;
the recommendation device is configured to, in response to one of (i) the first module score being greater than or equal to the first maximum threshold score, (ii) the second module score being greater than or equal to the second threshold score, and (iii) the third module score being greater than or equal to a third maximum threshold score, determine that a special purpose search intent of the search query exists;
the recommendation device is configured to, in response to determining that the special purpose search intent of the search query exists, send a positive recommendation to at least one of the general purpose search system, the special purpose search system or the user device;

the positive recommendation includes an instruction to obtain special purpose search results from the special purpose search system;
the special purpose search system is configured to, in response to the remote general purpose search system receiving the positive recommendation, generate application search results based on the search query;
the remote general purpose search system is configured to, in response to the special purpose search system generating application search results, obtain the application search results from the special purpose search system;
the remote general purpose search system is configured to generate general purpose search results based on the search query; and
the remote general purpose search system is configured to transmit a set of the application search results and a set of the general purpose search results to the user device.

28. The system of claim 27, wherein the recommendation device is configured to:
in response to one of (i) the first module score being less than the first minimum threshold score, and (ii) the third module score being less than a third minimum threshold score, send a negative recommendation to the remote general purpose search system,
wherein the negative recommendation includes an instruction to not obtain application search results from the special purpose search system.

29. The system of claim 28, wherein:
the negative recommendation comprises an integer value of zero; and
the positive recommendation comprises an integer value of one.

30. The system of claim 28, wherein:
the positive recommendation comprises a first decimal value;
the negative recommendation comprises a second decimal value; and
the first decimal value is greater than the second decimal value.

31. The system of claim 27, wherein:
the first module score, the second module score, and the third module score each include an indicator; and
the indicator corresponds to one of: (i) recommending to send the search query to the special purpose search system, (ii) recommending to not send the search query to the special purpose search system, or (iii) no recommendation on whether to send the search query to the special purpose search system.

32. The system of claim 27, wherein:
the first module score is determined by a partner data module executing at the recommendation device, and
the partner data module is configured to determine the first module score based on a historical special purpose application search and selection user behavior data in a special purpose search domain.

33. The system of claim 32, wherein the recommendation device is configured to receive the historical special purpose application search and selection user behavior data from other general purpose search systems.

34. The system of claim 27, wherein:
the second module score is determined by a metadata module executing at the recommendation device,
the metadata module is configured to determine the second module score by matching the search query with metadata associated with application search results or synonyms of the metadata, and
the metadata includes an associated metadata score.

35. The system of claim 34, wherein the recommendation device is configured to receive the metadata associated with application search results from the special purpose search system.

36. The system of claim 34, wherein the recommendation device is configured to normalize the search query and the metadata before matching the search query with the metadata.

37. The system of claim 27, wherein:
the third module score is determined by a search confidence module executing at the recommendation device;
the search confidence module is configured to determine the third module score by:
  matching the search query with a previously executed search query of the special purpose search system; and
  outputting a module score based on a search confidence score associated with the previously executed search query; and
the search confidence score indicates a level of relevance or popularity of the previously executed search query based on past user responses to the previously executed search query.

38. The system of claim 37, wherein the search confidence module is configured to output the third module score recommending sending the search query to the special purpose search system in response to the search confidence score being greater than a threshold search confidence score.

39. The system of claim 27, wherein the recommendation device is configured to:
in response to determining that the third module score is greater than a third minimum threshold score and less than the third maximum threshold score, determine, at a grammar matching module executing at the recommendation device, a fourth module score by:
  matching the search query with a grammar within a search domain of the special purpose search system, wherein each grammar has an associated grammar score; and
  outputting the fourth module score based on the associated grammar score of the grammar matching module; and
in response to the fourth module score being greater than a fourth maximum threshold, determine that the special purpose search intent of the search query exists.

\* \* \* \* \*